United States Patent [19]

Santoh et al.

[11] Patent Number: 4,965,178

[45] Date of Patent: Oct. 23, 1990

[54] OPTICAL RECORDING MEDIUM

[75] Inventors: Tsuyoshi Santoh, Yokohama; Chieko Hioki, Kawasaki, both of Japan

[73] Assignee: Canon Kabushiki Kaisha, Tokyo, Japan

[21] Appl. No.: 241,845

[22] Filed: Sep. 8, 1988

[30] Foreign Application Priority Data

Sep. 12, 1987 [JP] Japan ................................ 62-228992
Sep. 12, 1987 [JP] Japan ................................ 62-228994
Oct. 12, 1987 [JP] Japan ................................ 62-256767

[51] Int. Cl.$^5$ .................... G11B 7/24; G11B 11/03; G03C 1/73
[52] U.S. Cl. .................... 430/495; 430/270; 430/945; 346/135.1
[58] Field of Search .................... 430/945, 495, 270

[56] References Cited

U.S. PATENT DOCUMENTS

| 4,548,886 | 10/1985 | Katagiri et al. | 430/70 |
| 4,656,121 | 4/1987 | Sato et al. | 430/495 |
| 4,738,908 | 4/1988 | Oguchi et al. | 430/20 |

*Primary Examiner*—Paul R. Michl
*Assistant Examiner*—Mark R. Buscher
*Attorney, Agent, or Firm*—Fitzpatrick, Cella, Harper & Scinto

[57] ABSTRACT

An optical recording medium comprising a recording layer containing at least one compound selected from the group consisting of azulenium salt compounds represented respectively by Formulae (I), (II), (III) and (IV), and an optical recording method comprising forming pits and recording information by irradiation of a laser beam on an optical recording medium having a recording layer containing one or more of azulenium salt represented by Formulae (I), (II), (III) and (IV).

17 Claims, 2 Drawing Sheets

RECORDING POWER DEPENDENCE OF CARRIER-TO-NOISE RATIO. ( $P_R$:0.5mW,3MHz,11.0m/s)

OPTICAL RECORDING MEDIUM

BACKGROUND OF THE INVENTION

1. Field of the Invention

The present invention relates to an optical recording medium suited for optical writing recording by use of a laser beam, particularly a semiconductor laser beam, and, more particularly, to an improved optical recording medium that can be used in optical disk techniques and optical card techniques.

2. Related Background Art

In general, optical recording mediums as exemplified by optical disks and optical cards can record information in a high density by forming optically detectable pits of minute size, for example, of about 1 μm on a thin recording layer provided on a substrate having grooves of spiral, circular or linear form.

A focused laser beam may be scanned on the surface of this recording layer, so that the recording layer can absorb laser beam energy to form optically detectable pits thereon, and thus the writing of information can be performed. For example, in a heat mode recording system, the recording layer absorbs a heat energy to form minute concaves, i.e., pits, on that energy-absorbed parts by evaporation or fusion. In another heat mode system, the absorption of the energy of the irradiated laser beam can form pits having an optically detectable density difference on those parts.

The information recorded on the optical disks or optical cards can be detected by reading optical changes between the part on which the pits are formed and the part on which the pits are not formed. For example, a laser beam is scanned along a track, and the energy reflected by a disk is monitored by a photodetector. At the part on which the pits are formed, the reflection of the laser beam is lowered and the output from the photodetector becomes smaller. On the other hand, at the part on which the pits are not formed, the laser beam is sufficiently reflected and the output form the photodetector becomes larger.

Hitherto proposed as the optical recording mediums used in such optical disks and optical cards are those in which inorganic materials are mainly used, for example, metallic thin films such as aluminum-deposited films, bismuth thin films, tellurium oxide thin films, chalcogenite type amorphous glass films or the like. These thin films, however, have disadvantages such that they are sensitive to light of wavelengths generally of from 350 to 800 nm and also have a high reflectance to laser beams, resulting in a low utilization of laser beams.

Taking account of the above, researches have been made on organic thin films capable of optically causing changes in physical properties by using optical energy of relatively long wavelengths (for example, 780 nm or more). Such organic thin films are effective as being capable of forming pits with use of a semiconductor laser beam having an oscillation wavelength near 780 nm or 830 nm.

However, organic compounds that commonly have absorption characteristics on the longer wavelength side have a problem that they are unstable to heat.

For example, in handling optical recording mediums, they are not necessarily used only in well air-conditioned offices, and there must be taken into account their transportation, keeping in ware houses and temperature rise inside driving units, so that mediums having far superior stability to high-temperature have been sought after. In particular, potable optical recording mediums as exemplified by optical cards may preferably have the laminated structure that an opposed substrate is directly laminated on the recording layer with use of an adhesive, from the viewpoint of thickness or strength of the mediums.

Effectively used as the adhesive used in that occasion are hot-melt adhesives which have good workability. Since, however, many of the hot-melt adhesives have temperatures of about 100° C. at the time of lamination, sought after as recording layer is the one having far superior thermal resistance. Since also the optical cards are often handled by being personally carried, thus giving a high possibility that they are roughly handled, those having superior environmental stability including the thermal resistance have been sought after.

As a coloring matter that can solve such problems, U.S. Pat. No. 4,548,886 discloses an azulene coloring matter. More specifically, this coloring matter has superior optical characteristics, i.e., clear threshold characteristics of recording sensitivity and high recording sensitivity, and also can be formed into a film by coating.

SUMMARY OF THE INVENTION

An object of the present invention is to provide an optical recording medium having a recording layer comprising a coloring-matter thin film and better improved in the stability even under the environmental conditions of high temperature and high humidity without lowering the superior properties inherent in the above azulene coloring matter.

Another object of the present invention is to provide an optical recording medium having a recording layer comprising a coloring-matter thin film and improved in solvent solubility.

According to one aspect of the present invention, there is provided an optical recording medium of the present invention characterized by having a recording layer containing one or more compound(s) selected from azulenium salts represented respectively by Formulae (I), (II), (Ill) and (IV) shown below:

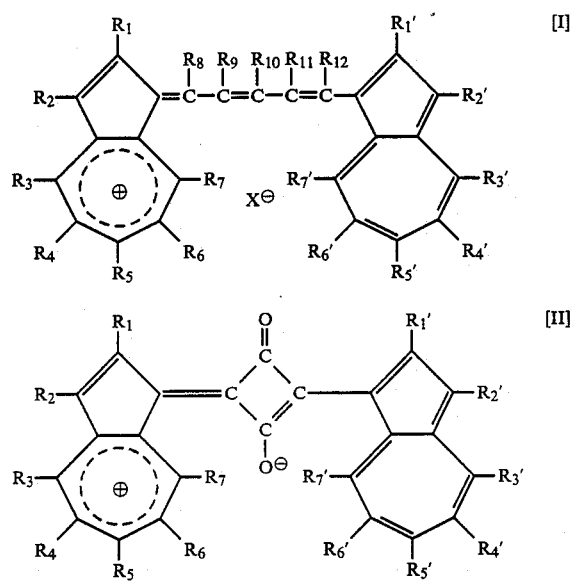

-continued

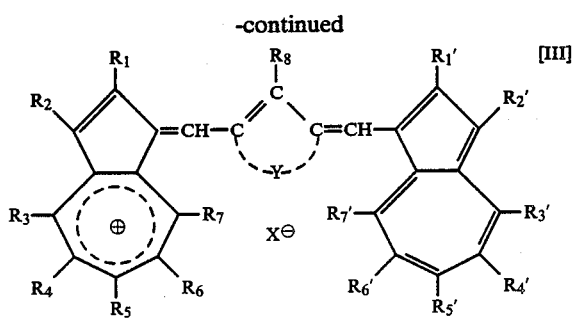

[III]

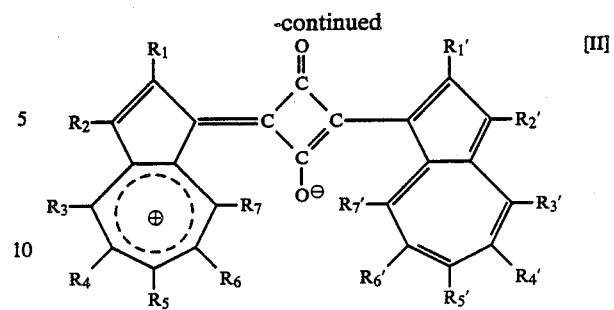

[II]

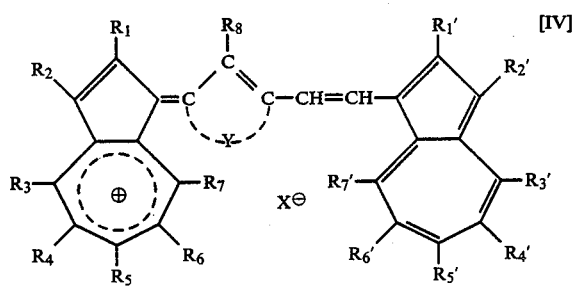

[IV]

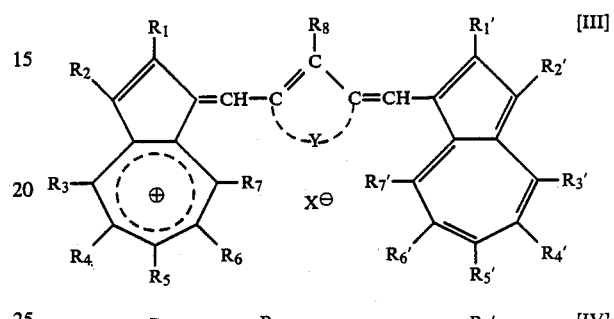

[III]

[IV]

Wherein $R_1$ to $R_{12}$ and $R'_1$ to $R'_7$ each represent a hydrogen atom, a halogen atom or a substituent that is a monovalent organic residual group; among combinations of $R_1$ with $R'_1$, $R_2$ with $R'_2$, $R_3$ with $R'_3$, $R_4$ with $R'_4$, $R_5$ with $R'_5$, $R_6$ with $R'_6$ and $R_7$ with $R'_7$, at least one combination comprises a combination of different substituents; $X^\ominus$ represents an anion residual group, and Y represents a divalent hydrocarbon group that forms a substituted or unsubstituted ring of 5 members, 6 members or 7 members: and any one combination among combinations of $R_1$ with $R_2$, $R_2$ with $R_3$, $R_3$ with $R_4$, $R_4$ with $R_5$, $R_5$ with $R_6$, $R_6$ with $R_7$, $R'_1$ with $R'_2$, $R'_2$ with $R'_3$, $R'_3$ with $R'_4$, $R'_4$ with $R'_5$, $R'_5$ with $R'_6$ and $R'_6$ with $R'_7$ may also form a substituted or unsubstituted condensed ring.

According to another aspect of the present invention, there is provided an optical recording method comprising forming pits and recording information by irradiation of a laser beam on an optical recording medium having a recording layer containing one or more of azulenium salt represented by Formula (I), (II), (III) or (IV) shown below:

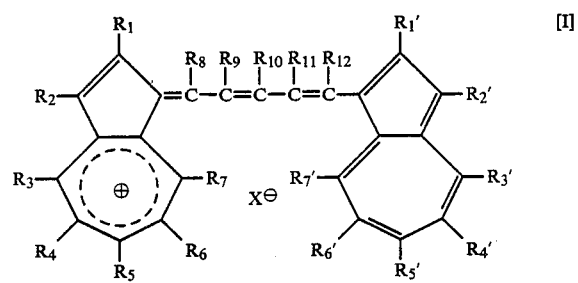

[I]

wherein $R_1$ to $R_{12}$ and $R'_1$ to $R'_7$ each represent a hydrogen atom, a halogen atom or a substituent that is a monovalent organic residual group; among combinations of $R_1$ with $R'_1$, $R_2$ with $R'_2$, $R'_3$ with $R'_3$, $R'_4$ with $R'_4$, $R'_5$ with $R'_5$, $R'_6$ with $R'_6$ and $R_7$ with $R'_7$, at least one combination comprises a combination of different substituents; $X^\ominus$ represents an anion residual group, and Y represents a divalent hydrocarbon group that forms a substituted or members; and any one combination among combinations of $R_1$ with $R'_2$, $R_2$ with $R'_3$, $R_3$ with $R_4$, $R_4$ with $R_5$, $R_5$ with $R_6$ with $R_6$ $R_7$, $R'_1$ with $R'_2$, $R'_2$ with $R'_3$, $R'_3$ with $R'_4$, $R'_4$ with $R'_5$, $R'_5$ with $R'_6$ and $R'_6$ with $R'_7$ may form a substituted or unsubstituted condensed ring.

DETAILED DESCRIPTION OF PREFERRED EMBODIMENTS

Figure 1:
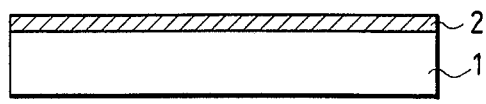
FIG. 1, FIG. 2, FIG. 3 and FIG. 4 are diagramatic cross sections illustrating embodiments of optical recording mediums according to the present invention.

The optical recording medium of the present invention has a recording layer comprising a thin film that is capable of undergoing a thermal action by absorption of electromagnetic radiations and optically reading information by such a thermal action, and contains at least one or more compound(s) selected from azulenium salts represented by the above Formula (I), (II), (III) or (IV).

In the above Formula (I), (II), (III) or (IV) $R_1$ to $R_{12}$ and $R'_1$ to $R'_7$ each represent a hydrogen atom, a halogen atom (including a chlorine atom, a bromine atom and an iodine atom) or a monovalent organic residual group.

The monovalent organic group can be selected from a wide variety of groups, but may particularly include an alkyl group (such as methyl, ethyl, n-propyl, isopropyl, n-butyl, t-butyl, n-amyl, n-hexyl, n-octyl, 2-ethylhexyl or t-octyl), an alkoxy group (such as methoxy, ethoxy, propoxy or butoxy), a substituted or unsubstituted aryl group (such as phenyl, tolyl, xylyl, ethylphenyl, methoxyphenyl, ethoxyphenyl. chlorophenyl, nitrophenyl, dimethylaminophenyl, β-naphthyl or δ-naphthyl), a substituted or unsubstituted heterocyclic group (such as pyridyl, quinolyl, carbazolyl, furyl, thienyl or pyrazolyl), a substituted or unsubstituted aralkyl group (such as benzyl, 2-phenylethyl, 2-phenyl-1-methylethyl, bromobenzyl, 2-bromophenylethyl, methylbenzyl, methoxybenzyl or nitrobenzyl) an acyl group (such as acetyl, propionyl, butyryl, valeryl, benzoyl, trioyl, naphthoyl, phthaloyl or furoyl), a substituted or unsubstituted amino group (such as amino, dimethylamino, diethylamino, dipropylamino, acetylamino or benzoylamino), a substituted or unsubstituted styryl group (such as styryl, dimethylaminostyryl, diethylaminostyryl, dipropylaminostyryl, methoxystyryl, ethoxystyryl or methylstyryl), a nitro group, a hydroxyl group, a mercapto group, a thioether group, a carboxyl group, a carboxylic acid ester, a carboxylic acid amide, a cyano group or a substituted or unsubstituted arylazo group (such as phenylazo, α-naphthylazo, β-naphthylazo, dimethylaminophenylazo, chlorophenylazo, nitrophenylazo, methoxyphenylazo or tolylazo).

At least one combination among combinations of $R_1$ with $R_2$ $R_2$ with $R_3$, $R_3$ with $R_4$, $R_4$ with $R_5$, $R_5$ with $R_6$, $R_6$ with $R_7$, $R'_1$ with $R'_2$, $R'_2$ with $R'_3$, $R'_3$ with $R'_4$, $R'_4$ with $R'_5$, $R'_5$ with $R'_6$ and $R'_6$ with $R'_7$ may also form a substituted or unsubstituted condensed ring. The condensed ring, which is a condensed ring of 5 members, 6 members or 7 members, may include an aromatic ring (such as benzene, naphthalene, chlorobenzene, bromobenzene, methylbenzene, ethylbenzene, methoxybenzene or ethoxybenzene), a heterocyclic ring (such as a furan ring, a benzofuran ring, a pyrol ring, a thiophene ring, a pyridine ring, a quinoline ring or a thiazole ring), an aliphatic ring (such as dimethylene, trimethylene or tetramethylene).

The anion residual group $X^\oplus$ in the formulae represents an anion such as a chloride ion, a bromide ion, an iodide ion, a perchlorate ion, a nitrate ion, a benzenesulfonate ion, a p-toluenesulfonate ion, a methyl sulfate ion, an ethyl sulfonate ion, a propyl sulfonate ion, a tetrafluoroborate ion, a tetraphenylborate ion, a hexafluorophosphate ion, a benzenesulfinate ion, an acetate ion, a trifluoroacetate ion, a propionate ion, a benzoate ion, an oxalate ion, a succinate ion, a malonate ion, an oleate ion, a stearate ion, a citrate ion, a monohydrogendiphosphate ion, a dihydrogenmonophosphate ion, a pentachlorostannate ion, a chlorosulfonate ion, a fluorosulfonate ion, a trifluoromethanesulfonate ion, a hexafluoroarsenate ion, a hexafluoroantimonate ion, a molybdate ion, a tungstate ion, a titanate ion or a zirconate ion.

Among combinations of $R_1$ with $R'_1$ $R_2$ with $R'_2$, $R_3$ with $R'_3$, $R_4$ with $R'_4$, $R_5$ with $R'_5$, $R_6$ with $R'_6$ and $R_7$ with $R'_7$, at least one combination comprises a combination of different substituents.

Among combinations of $R_1$ with $R'_1$, $R_2$ with $R'_2$, $R_3$ with $R'_3$, $R_4$ with $R'_4$, $R_5$ with $R'_5$, $R_6$ with $R'_6$ and $R_7$ with $R'_7$, particularly preferable combinations of different substituents that may bring about superior stability under the environment of high temperature and high humidity and also bring about improvement in solubility are exemplified by a combination of a hydrogen atom with an alkyl group such as a combination of a hydrogen atom with a methyl group, a hydrogen atom with an ethyl group, a hydrogen atom with a n-propyl group, a hydrogen atom with an isopropyl group, a hydrogen atom with a n-butyl group or a hydrogen atom with a t-butyl group, or a combination of a hydrogen atom with a methoxy group, a hydrogen atom with an ethoxy group or a hydrogen atom with an alkoxy group.

When any of the substituents of $R_1$ to $R_7$ or $R'_1$ to R'phd 7 form a condensed ring in the form of $R_n-R_{n+1}$ or $R'_n-R'_{n-1}$ (n is an integer of 1 to 6), preferred is the combination that one of $R_n-R_{n+1}$ and $R'_n$-$R'n+1$ is a heterocyclic ring such as thiophen or pyrol and the substituent at the corresponding position in the other azulene ring is a substituent selected from a hydrogen atom or an alkyl group such as methyl, ethyl, n-propyl, isopropyl, n -butyl or t-butyl. Examples of the azulenium salts used in the present invention are listed below, but by no means limited to these.

Examples of the compound represented by the above Formula

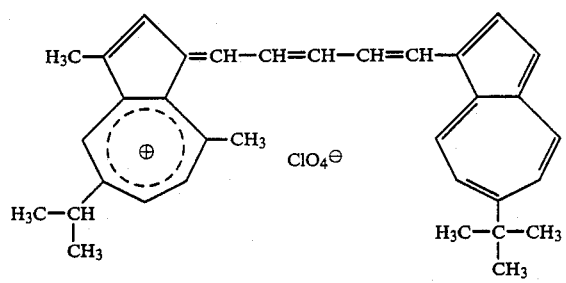

(1)

(2)
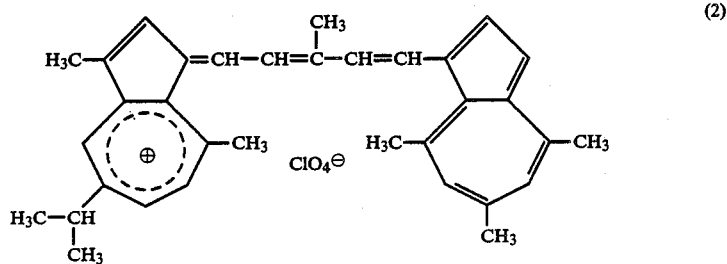
(3)
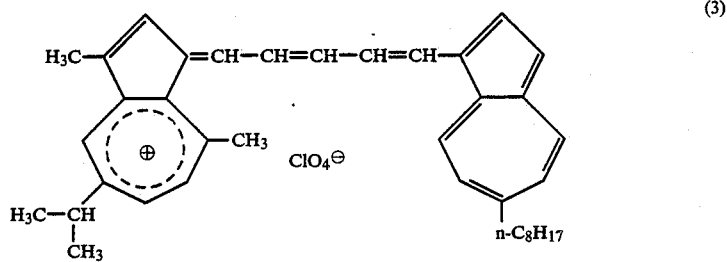
(4)
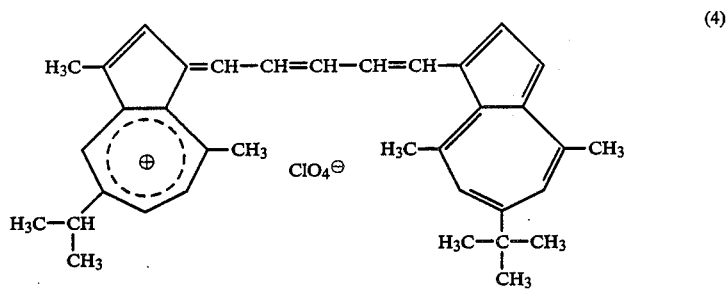
(5)
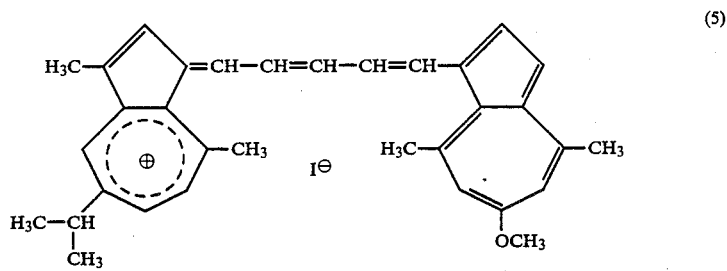
(6)
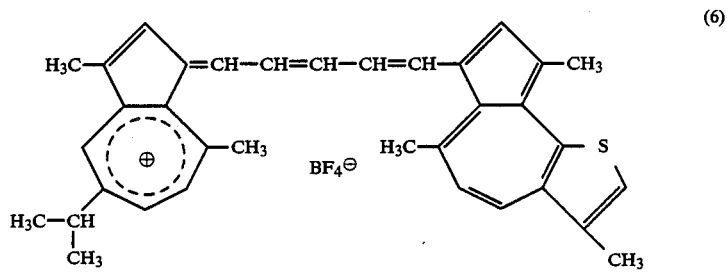
(7)
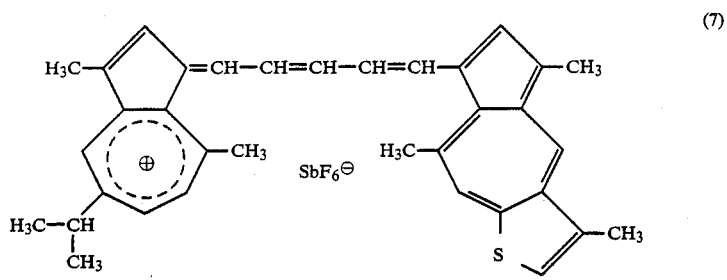

-continued
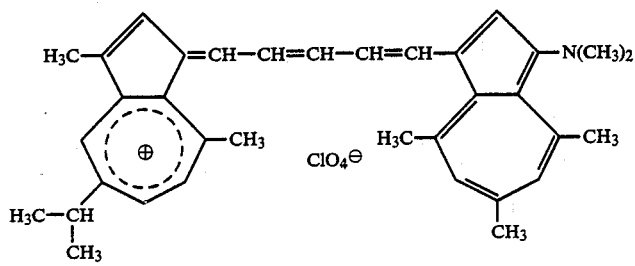
(8)
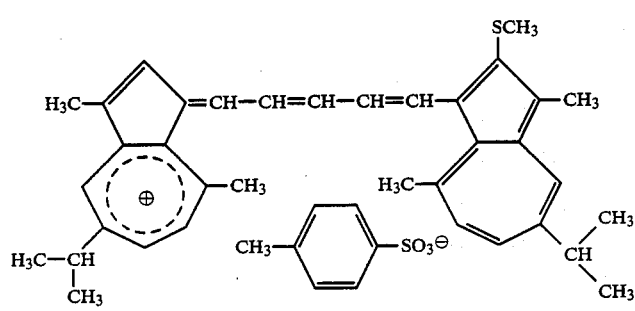
(9)
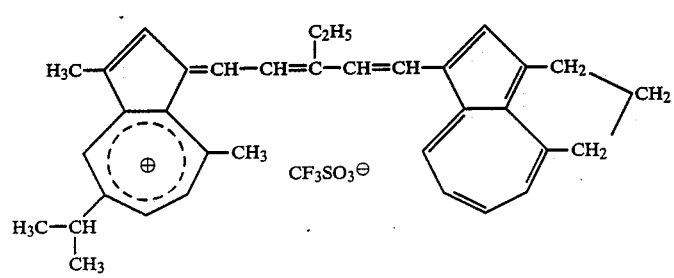
(10)
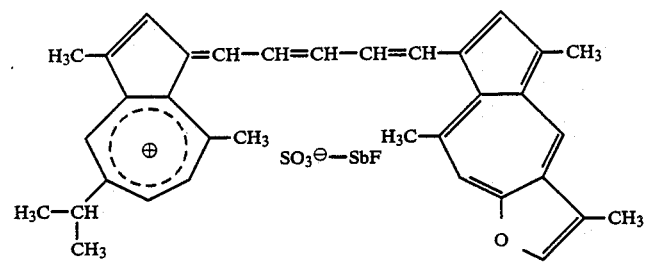
(11)
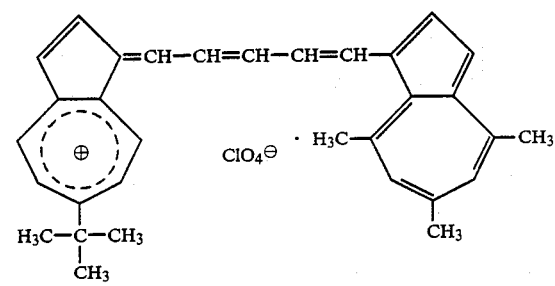
(12)

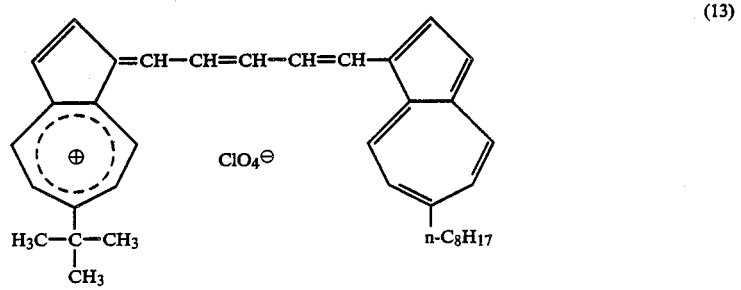
(13)
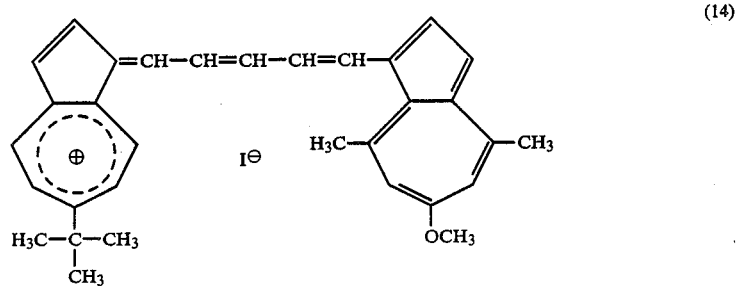
(14)
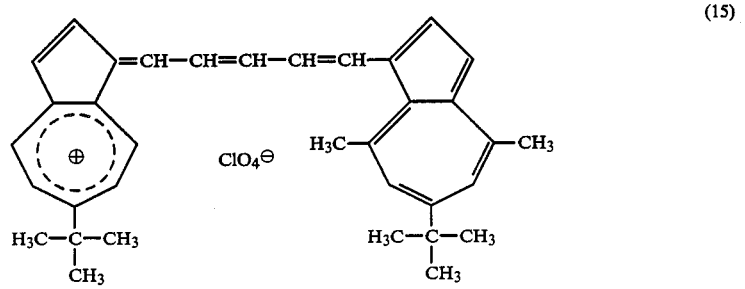
(15)
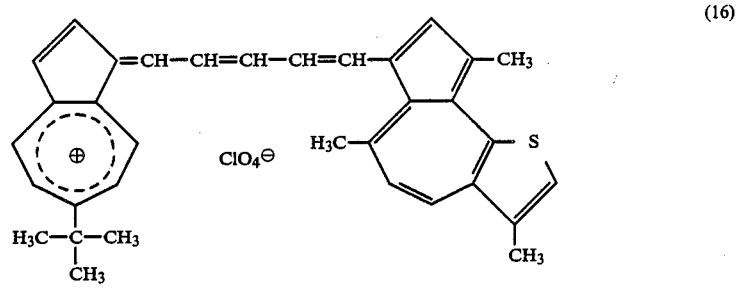
(16)
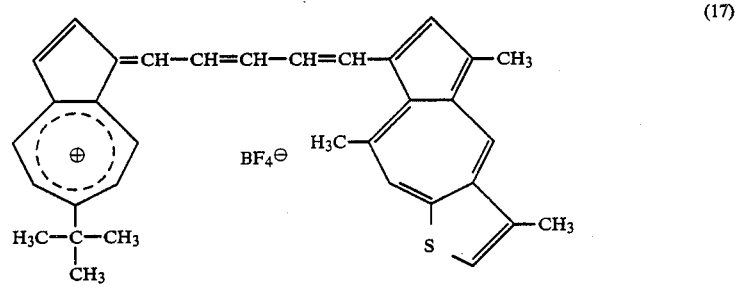
(17)

-continued
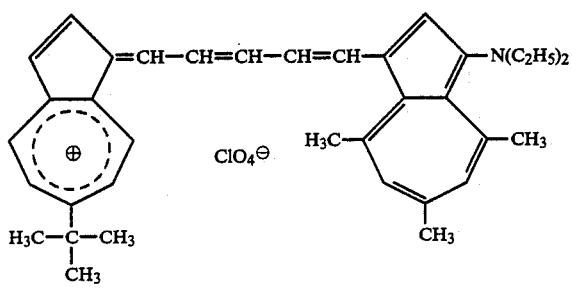
(18)
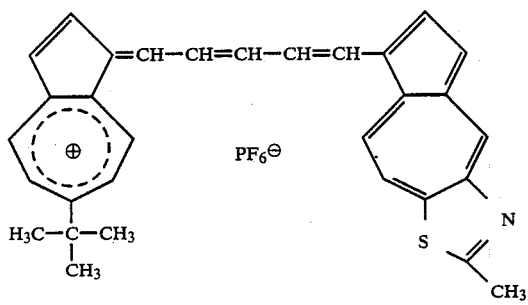
(19)
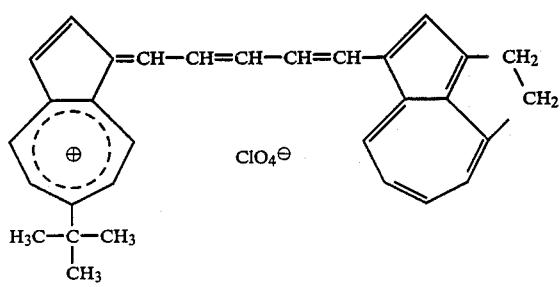
(20)
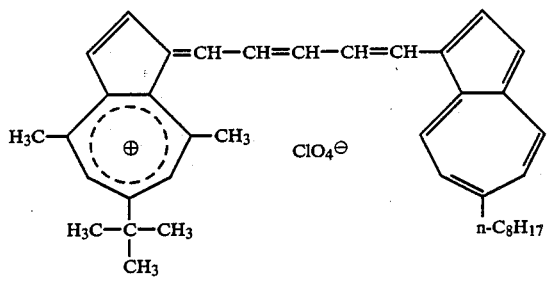
(21)
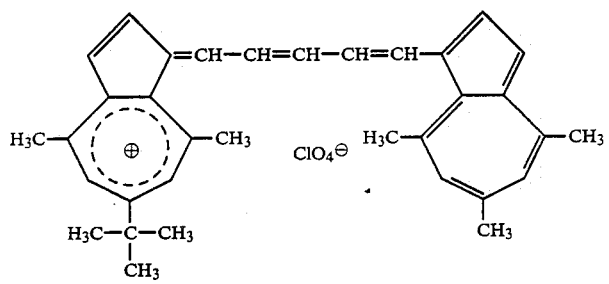
(22)

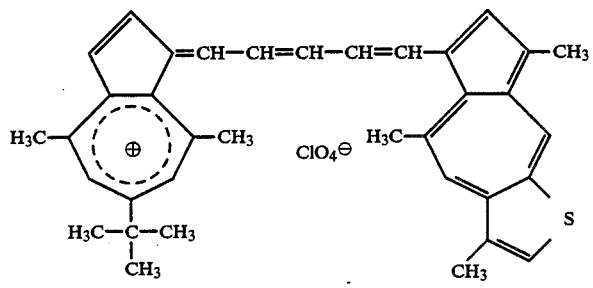
(23)
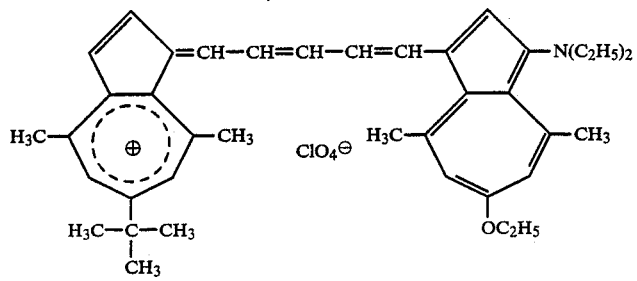
(24)
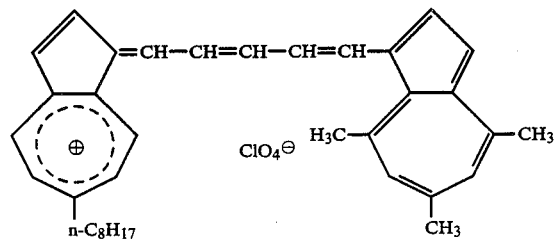
(25)
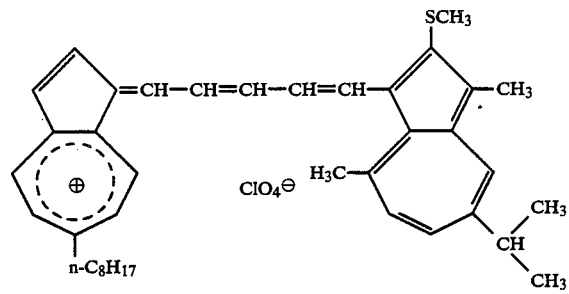
(26)
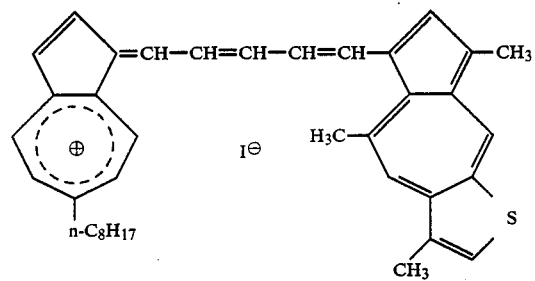
(27)

-continued
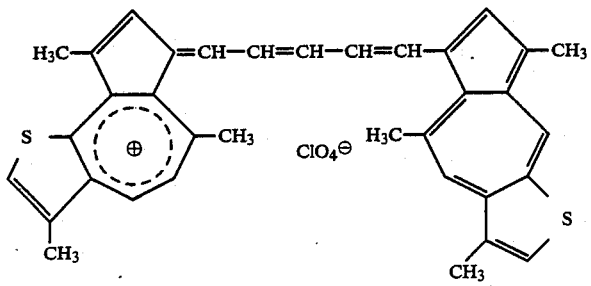
(28)
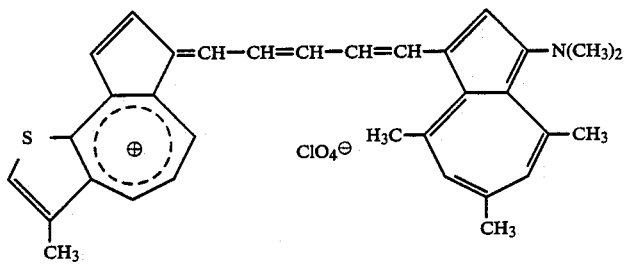
(29)
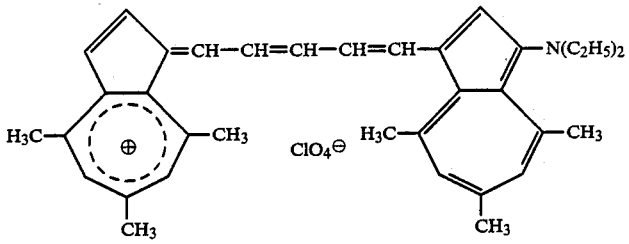
(30)
Examples of the compound represented by the above Formula [II]
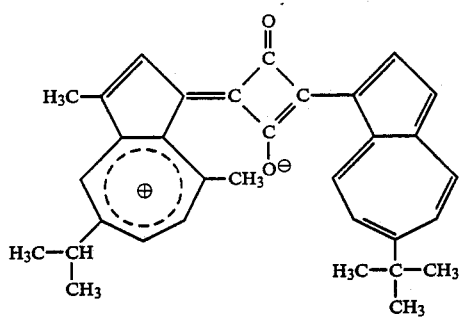
(31)
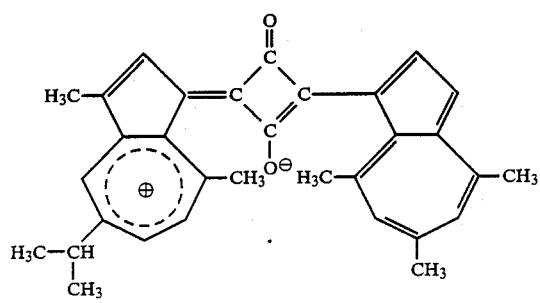
(32)

-continued
(33)
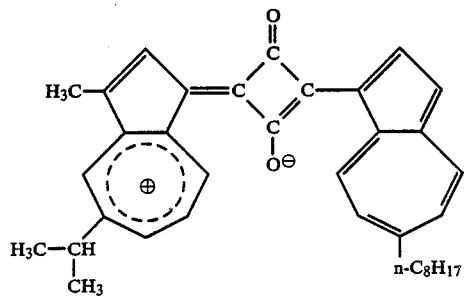
(34)
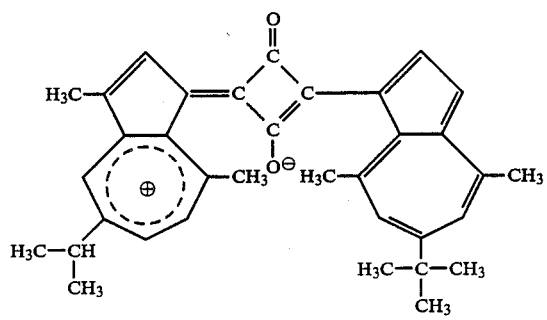
(35)
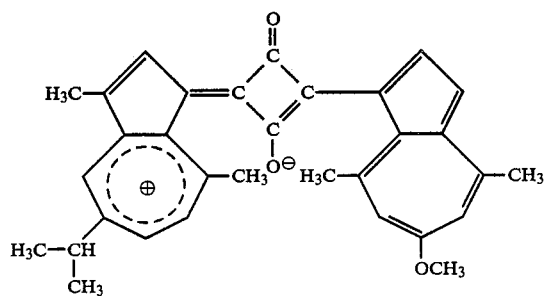
(36)
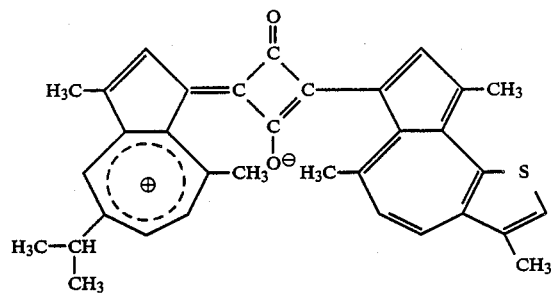
(37)
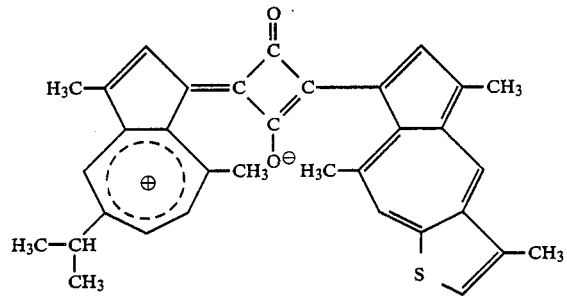

-continued
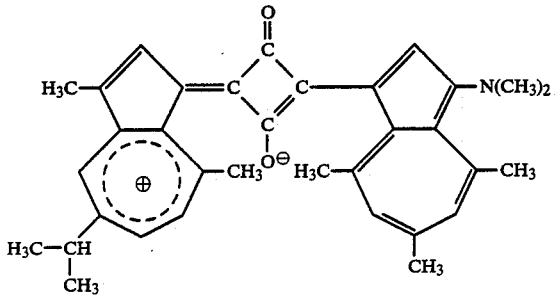
(38)
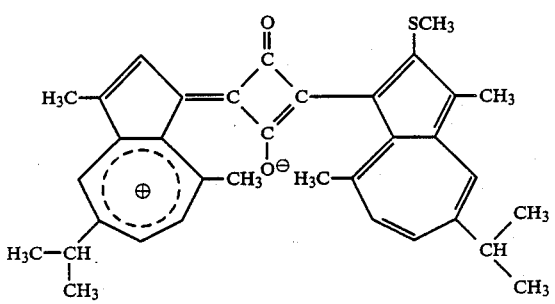
(39)
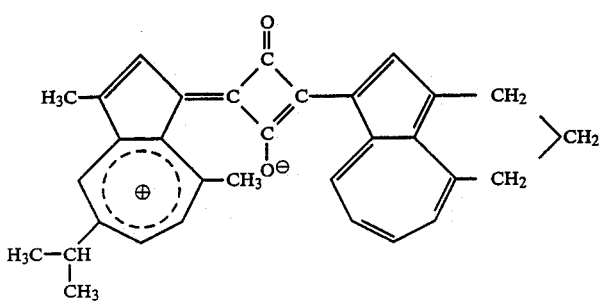
(40)
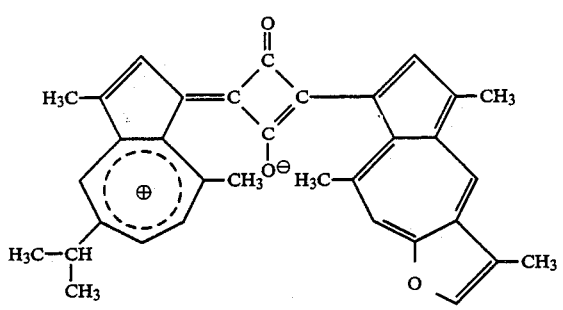
(41)
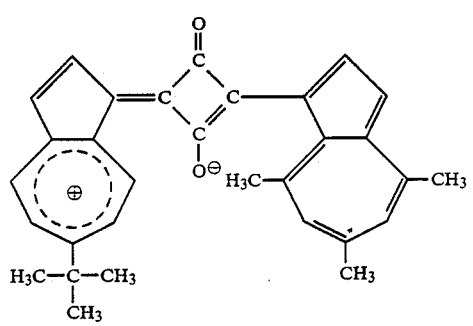
(42)

-continued
(43)
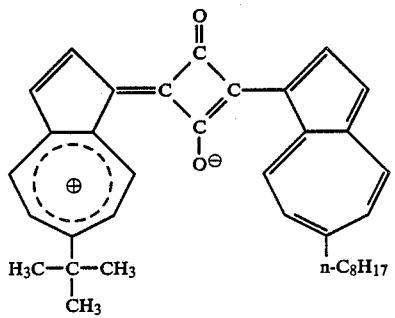
(44)
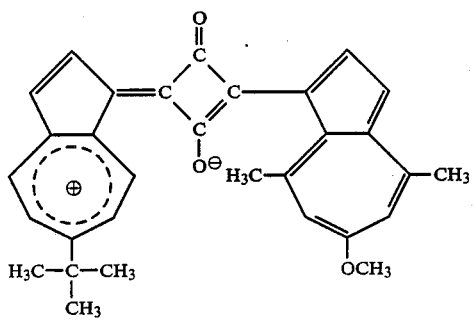
(45)
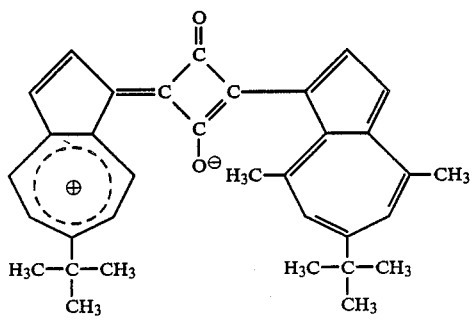
(46)
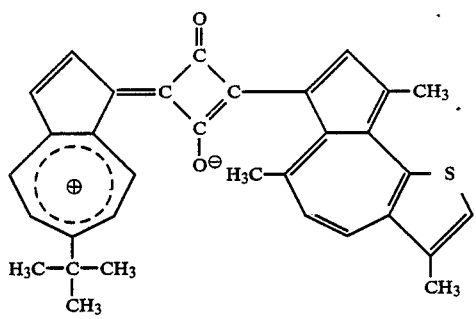
(47)
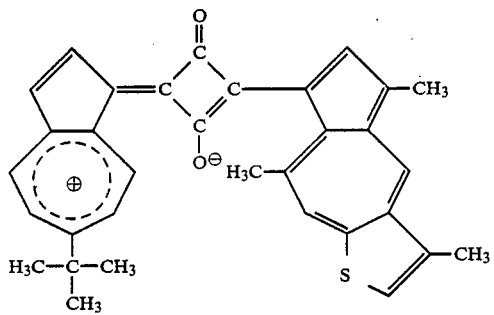

-continued
(48)
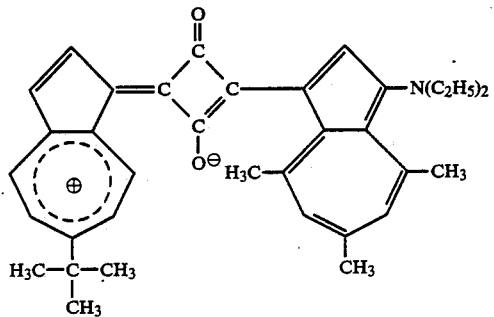
(49)
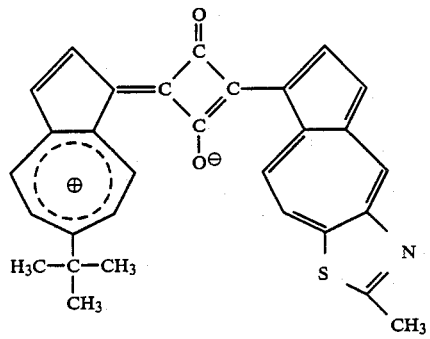
(50)
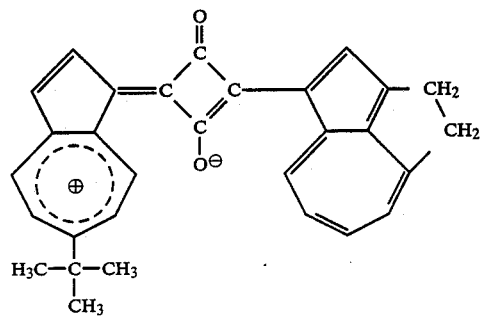
(51)
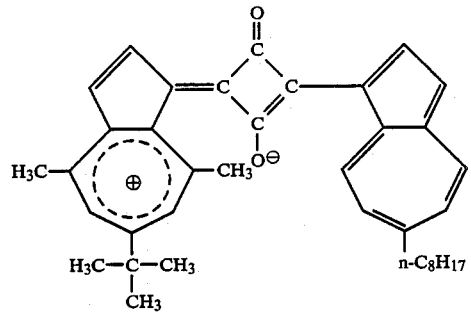
(52)
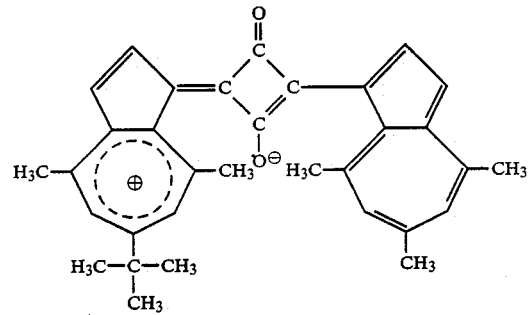

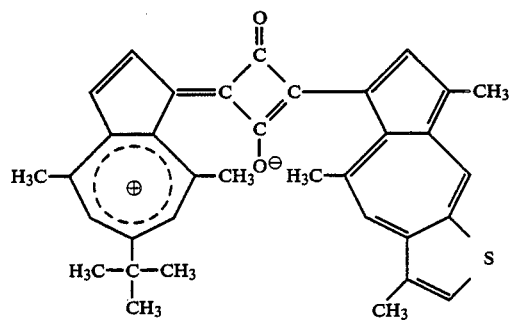
(53)
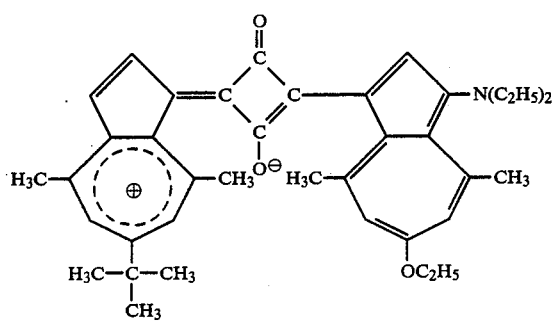
(54)
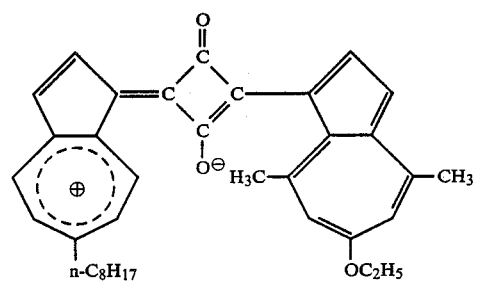
(55)
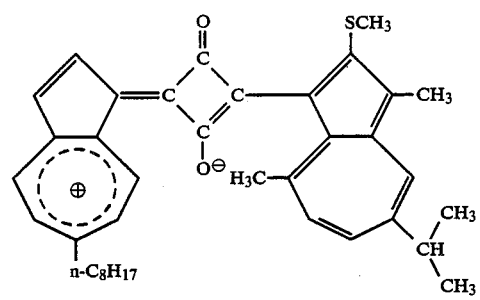
(56)
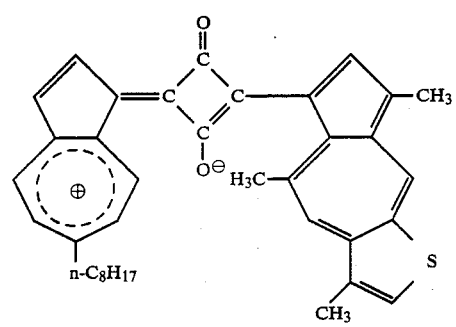
(57)

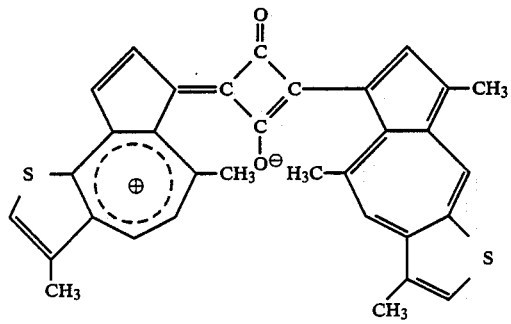
(58)
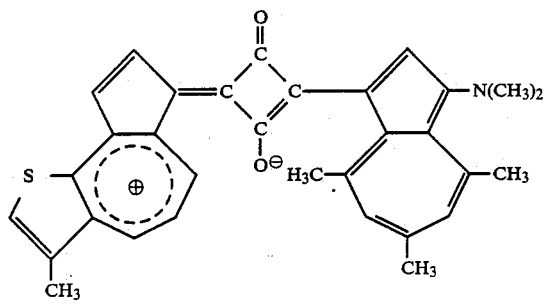
(59)
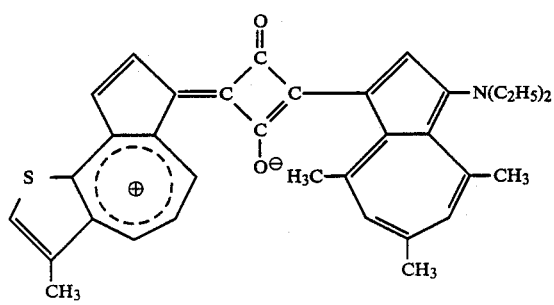
(60)
Examples of the compound represented by the above Formulas [III] and [IV]
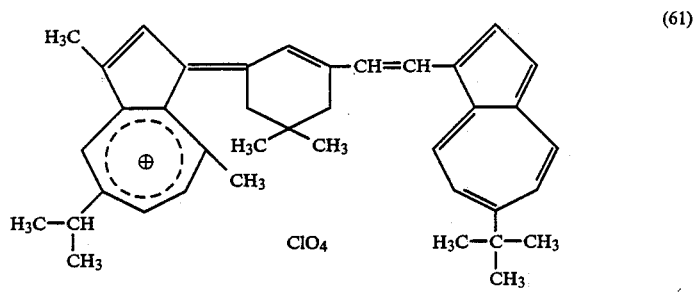
(61)
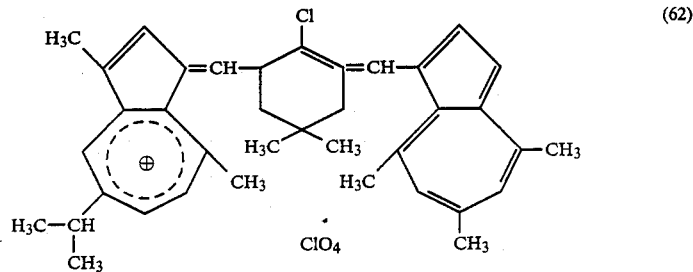
(62)

-continued
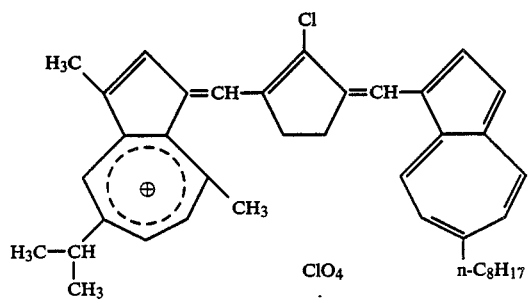
(63)
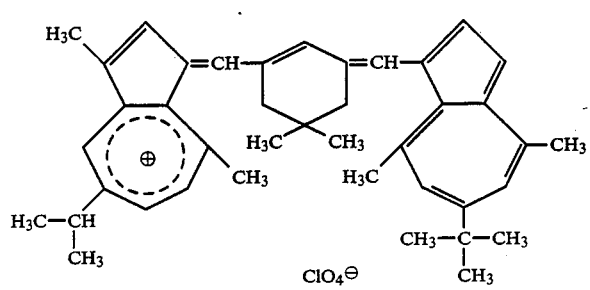
(64)
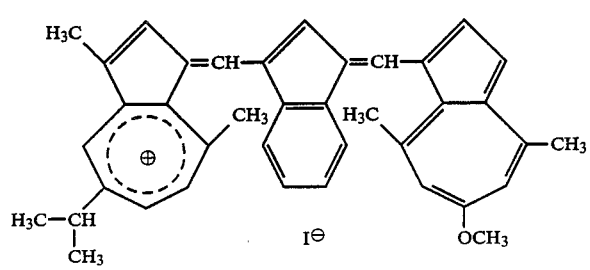
(65)
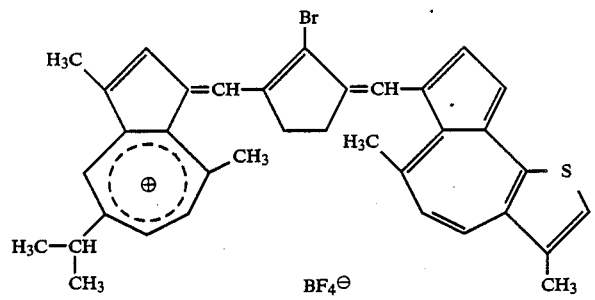
(66)
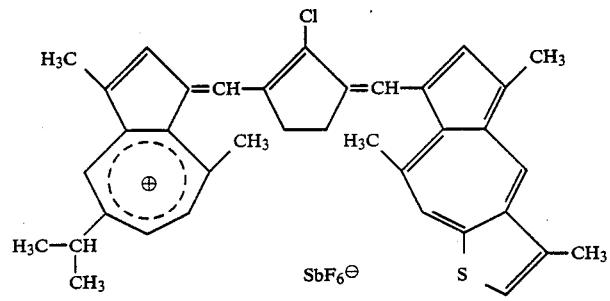
(67)

-continued
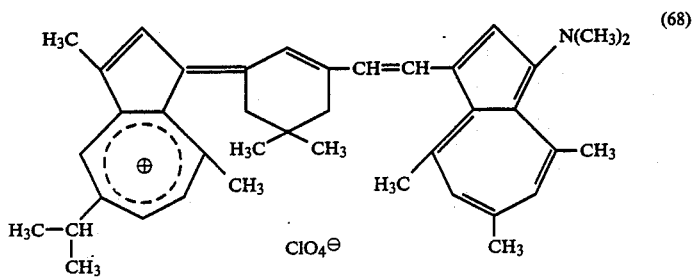
(68)
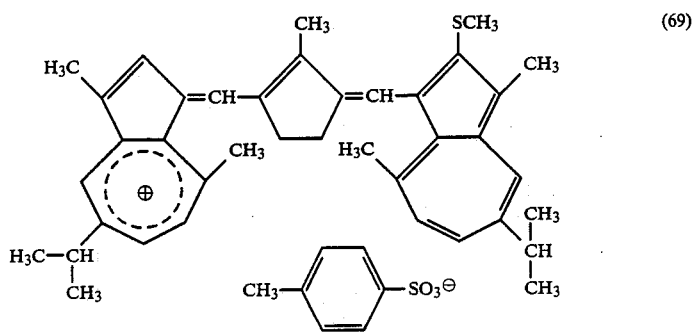
(69)
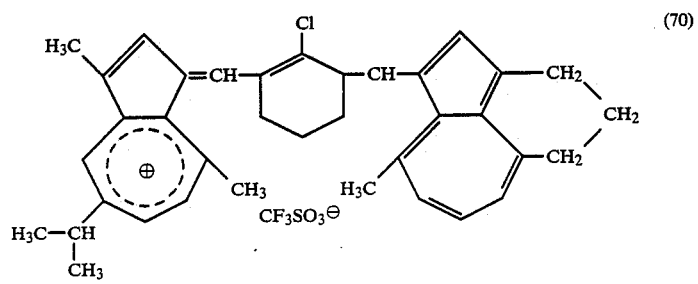
(70)
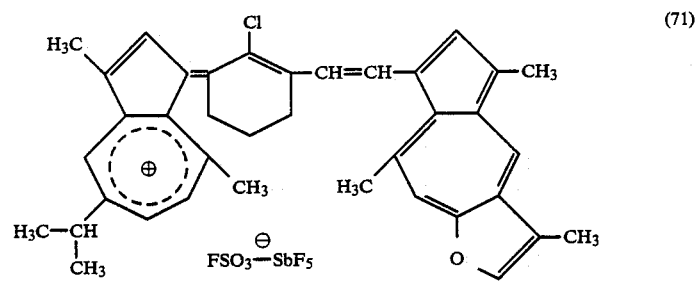
(71)
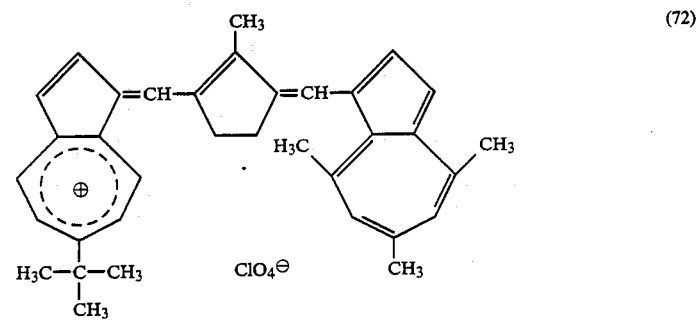
(72)

-continued
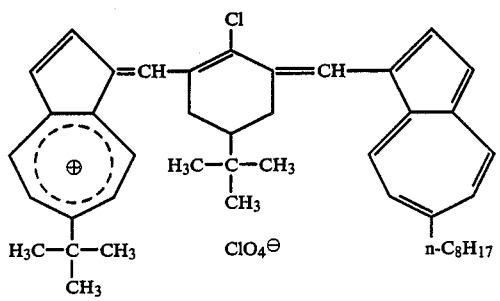
(73)
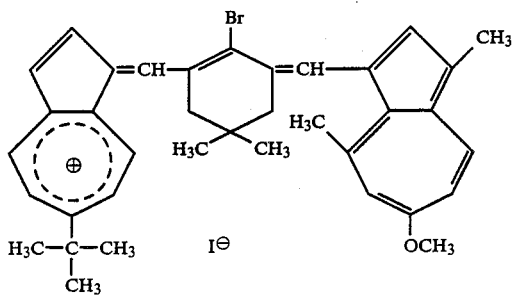
(74)
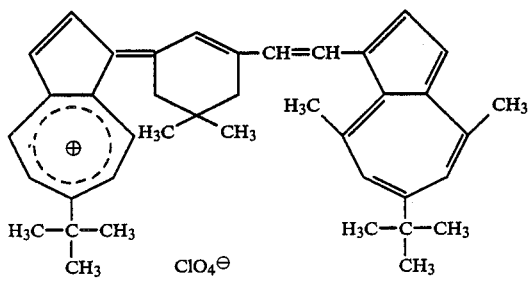
(75)
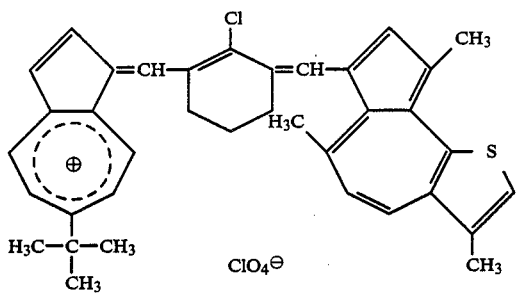
(76)
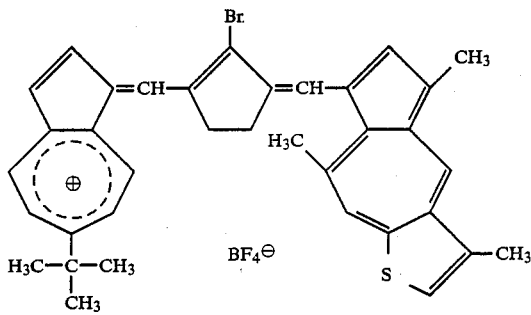
(77)

-continued
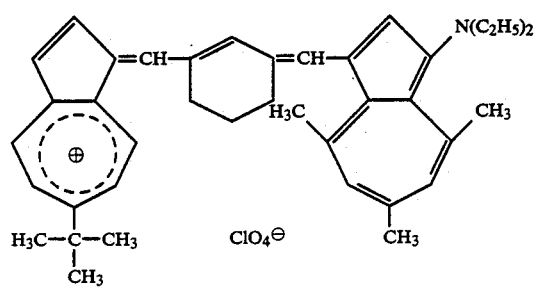 (78)
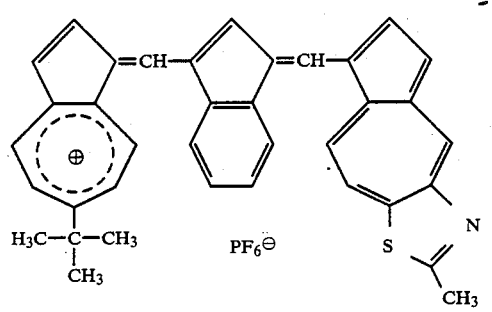 (79)
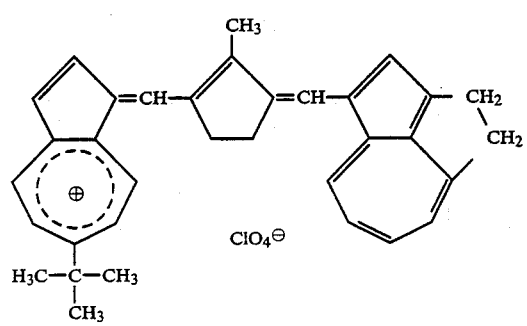 (80)
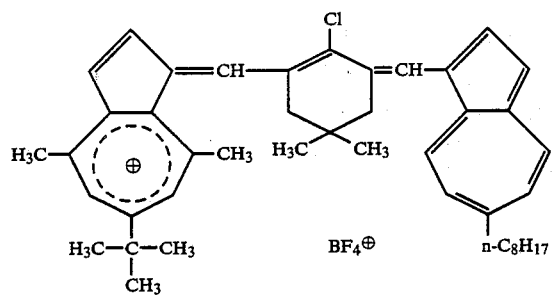 (81)
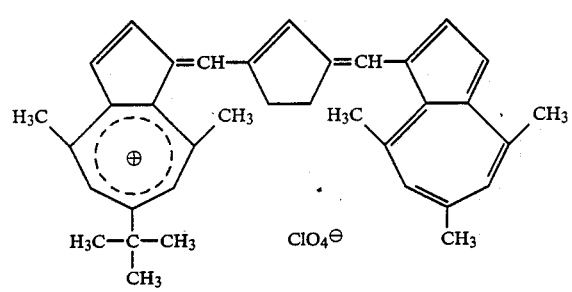 (82)

-continued
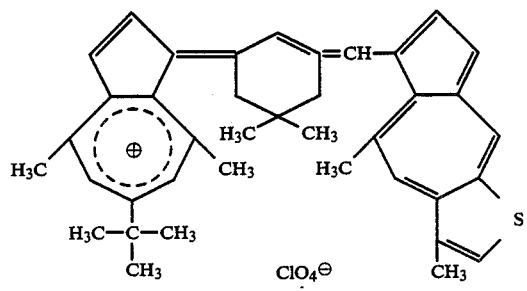 (83)
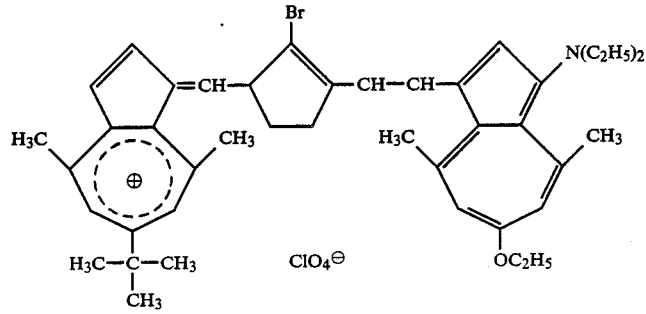 (84)
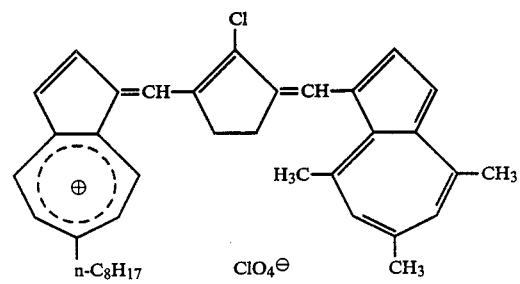 (85)
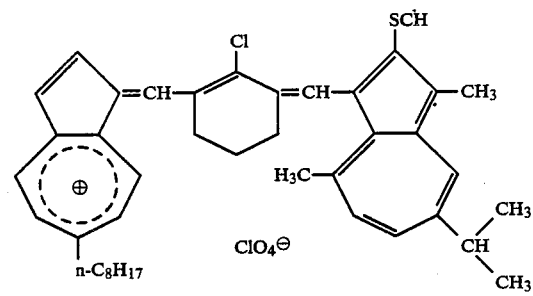 (86)
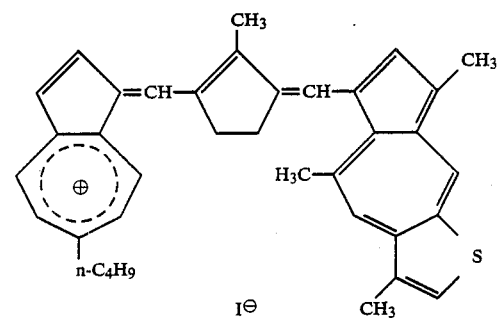 (87)

-continued

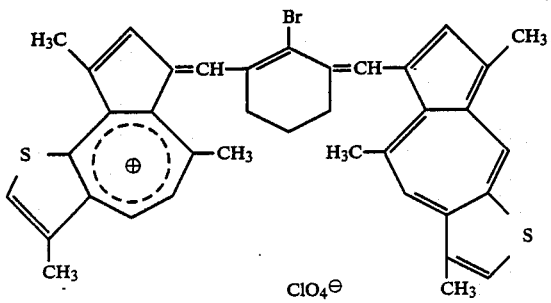
(88)

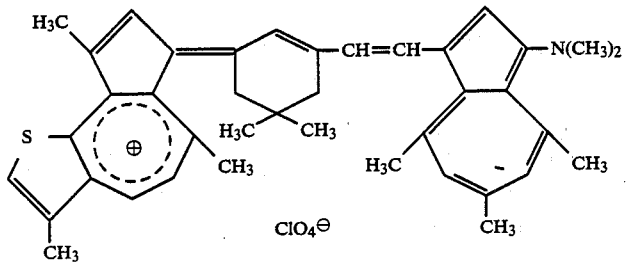
(89)

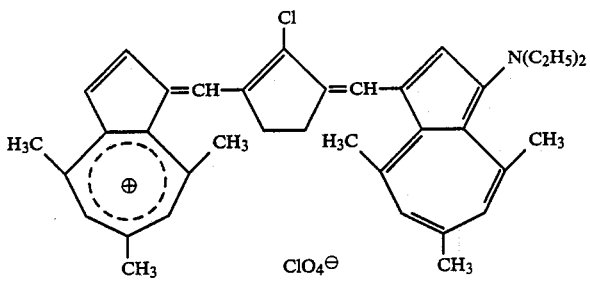
(90)

The compound represented by the above Formula (I) can be obtained by reacting an azulene compound with a glutacondialdehyde in the presence of a strong acid in a suitable solvent, as described in Journal of The Chemical Society, p. 3591 (1961). Alternatively, it can be obtained by synthesizing a pentadienealdehyde derivative of an azulene compound and then reacting it with an azulene compound in the presence of a strong acid in a suitable solvent, as described in Hans Long Lindner, Koudeusierte Carboncyclisch-kondensierte Synsteme-I.Pentalene und Dihydro-pentalene, p. 269.

The compound represented by the above Formula (II) can be readily obtained by reacting an azulene compound with a squaric acid in a suitable solvent, as described in Angewandte Chemie, Vol. 78, No. 20, p. 937 (1966). For example, the reaction can be carried out by removing water that is boiled together with benzene, with use of a butanol/benzene mixed solvent. Next, silica gel column chromatography may follow, so that a desired unsymmetrical compound can be separated and purified.

Also, the compounds represented by the above Formulas (III) and (IV) can be synthesized by reacting an azulene compound or an azulene compound derivative with a hydroxyl compound as exemplified by 2-chloro-1-formyl-3-hydroxymethylenecyclohexeneisophorone, a dihydroxyl compound, a carbonyl compound, a diamino compound, a trimethoxy compound etc., that forms an intermediate chain, in the presence of a strong acid, in the like manner as the cyanine synthesis method disclosed in U.S. Pat. No. 2,734,900.

The optical recording medium of the present invention can be formed by providing on a substrate 1 a recording layer 2 as shown in FIG. 1, that contains one or more compounds selected from the azulenium salts represented by the above Formula (I), (II), (III) or (IV).

In forming this recording layer 2, the azulenium salts may be used in combination of one or more compounds selected from azulenium salts represented by the same formula, or may be used in combination of two or more compounds selected from the azulenium salts represented by different formulas. There may further be used a mixture with other dyes as exemplified by azulene dyes other than those represented by the above Formula (I), (II), (111) or (IV), polymethine dyes, pyrylium dyes, squarylium dyes, croconium dyes, triphenylmethane dyes, xanthene dyes, anthraquinone dyes, cyanine dyes, phthalocyanine dyes. dioxazine dyes, tetrahydrocholine dyes, tiphenothiazine dyes, phenanthrene dyes, aminium salt-diimonium salt dyes, and metal chelate complex dyes or metals or metal compounds as exemplified by Al, Te, Bi, Sn, In, Se, SnO, $TeO_2$, As and Cd, or ultraviolet absorbents, etc. The above other dyes, metals, metal compounds, ultraviolet absorbents, etc. may also be laminated on the recording layer 2 containing one or more compounds selected from the above Formula (I), (II), (III) or (IV).

The recording layer 2 may be formed on the substrate 1 by coating, or according to various methods such as vapor deposition. When the coating is employed, the layer can be formed by coating on the substrate 1 a solution obtained by dissolving or dispersing the azulenium salts in an organic solvent. Taking account of film-forming properties and coating stability, a binder may be optionally mixed in the recording layer to carry out film formation.

As to the organic solvent that can be used in coating, though variable depending on whether the above azulenium salts are used in the dispersed state or the dissolved state, there can be used, in general, solvents of an alcohol type, a ketone type, an amide type, an ether type, an ester type, an aliphatic halogenated hydrocarbon type, an aromatic type or an aliphatic hydrocarbon type. Also, the binder may include, for example, nitrocellulose, ethyl cellulose, polystyrene, polyvinyl pyrrolidone, polymethyl methacrylate and polyamide. Also, optionally used as additives are wages, higher fatty acids and amides (as exemplified by oleyl amide).

In the above binder, plasticizers such as dioctyl phthalate, dibutyl phthalate and tricrezyl phosphate, oils such as mineral oil and vegetable oil, and also dispersants such as sodium benzene sulfonate and polyoxyethylene alkylphenyl eters and other additives may be appropriately mixed to enhance the film-forming properties and coating stability of the recording layer.

The coating can be carried out by using coating methods such as dip coating, spray coating, spinner coating, bead coating, Meyer bar coating, blade coating, roller coating and gravure coating.

The azulenium salts may desirably be contained in the recording layer 2 in an amount usually of from 40 to 100 % by weight, preferably from 50 to 100 % by weight. The amount otherwise less than 40 % by weight makes it impossible to obtain sufficient light absorption of the recording layer and sufficient light reflectance to reproducing laser beams.

The recording layer 2 may appropriately have a film thickness of from 100 Å to 20 $\mu$m, preferably from 200 Å to 1 $\mu$m. The layer may preferably be as thin as possible so long as a film having a sufficient light reflectance to recording laser beams can be formed in a stable state.

Figure 2:
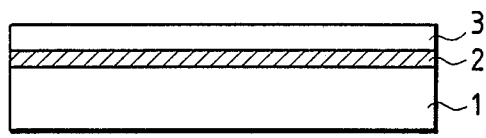

The optical recording medium of the present invention may be further provided on the recording layer 2 with a protective layer 8 as illustrated in FIG. 2, that is transparent to the recording and reproducing laser beams. The protective layer 3 may be opaque without any difficulty in the case when light is irradiated from the substrate 1 side.

Figure 3:
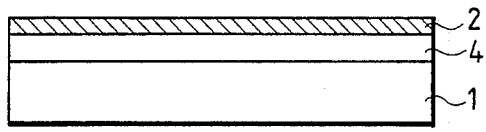

A subbing layer 4 may further be provided between the substrate 1 and the recording layer 2 as illustrated in FIG. 3.

Figure 4:
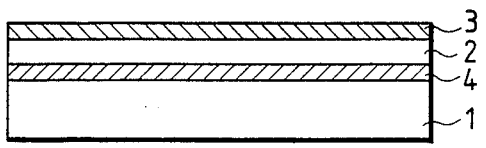

It is also possible to use together the protective layer 3 and the subbing layer 4 as illustrated in FIG. 4.

The subbing layer is provided for the purposes of (a) improving adhesion, (b) providing a barrier to water or gas, (c) improving storage stability of the recording layer, (d) improving reflectance, (e) protecting the substrate from solvents, and (f) forming pregrooves. For the purpose (a), there can be used various materials as exemplified by ionomer resins, polyamide resins, vinyl resins, natural macromolecules, silicone and liquid rubber, or various substances such as silane coupling agents. For the purposes (b) and (c), usable in addition to the above polymeric materials are inorganic compounds as exemplified by $SiO_2$, $MgF_2$, SiO, $TiO_2$, ZnO, TiN and SiN, metals or semi-metals as exemplified by Zn, Cu, S, Ni, Cr, Ge, Se, Cd, Ag and Al For the purpose (d), usable are metals as exemplified by Al and Ag, or organic thin films having metallic gloss, as exemplified by those comprising a cyanine dye, a methine dye or the like. For the purposes (e) and (f), usable are ultraviolet-curable resins, thermosetting resins and thermoplastic resins. The subbing layer may appropriately have a film thickness of from 50 Å to 100 $\mu$m, preferably from 200 Å to 30

The protective layer is provided for the purposes of protection from scratches, dust, stains or the like, improving storage stability of the recording layer, and improving the reflectance, and usable as materials therefor are the same materials as in the subbing layer. The protective layer may appropriately have a film thickness of from 100 Å or more, preferably 1,000 Å or more.

Here, the subbing layer and/or the protective layer may contain one or more of the azulenium salt compounds of the invention, represented by Formula (I), (II), (III) or (IV). The subbing layer or the protective layer may also contain stabilizers, dispersants, flameretardants, lubricants, antistatic agents, surface active agents, plasticizers, etc.

In another constitution of the optical recording medium of the present invention, the optical recording medium may have the so-called air sandwiched structure that two sheets of recording mediums having the same constitution as illustrated in FIG. 1 to FIG. 4 (one of which may consist of only the substrate as occasion demands) are used so that the recording layer 2 may be disposed and closed inside, or may have the so-called closed structure (or laminated structure) that they are joined interposing the protective layer 3.

In the optical recording medium of the present invention, recording may be performed by irradiating a gas laser beam such as a herium neon laser beam (oscillation wavelength: 633 nm), but, more preferably, suited is a method in which the recording is performed by irradiating a laser beam having a wavelength of 750 nm or more, particularly a laser beam having oscillation wavelengths in the near infrared or infrared region, such as a gallium aluminum-arsenic semiconductor laser beam (oscillation wavelength: 830 nm). To perform reading, the above laser beams can be used. Here, the writing and reading can be performed with laser beams having the same wavelength, or can also be performed with laser beams having different wavelengths.

Usable as the substrate 1 used in the present invention are plastics such as polycarbonates, polyesters, acrylic resins, polyolefin resins, phenol resins, epoxy resins, polyamides and polyimides, or glass, metals, etc.

As described above, the optical recording medium of the present invention has made it possible to improve the stability under the environmental conditions of high temperature and high humidity without lowering the excellent properties inherent in the azulene compounds. It has further become possible to provide an optical recording medium capable of being directly coated on a substrate having good solubility to general purpose solvents and liable to be damaged by organic solvents such as polycarbonate, thus having excellent productivity.

EXAMPLES

The present invention will be described below in greater detail by giving Examples, but by no means limited to these.

Example 1

On a polycarbonate (hereinafter abbreviated as "PC") substrate of 130 mm in diameter and 1.2 mm in thickness and provided with pregrooves by injection molding, a solution obtained by dissolving 3 parts by weight of an azulenium salt corresponding to the above exemplary azulenium salt compound No.(1) in 97 parts by weight of diacetone alcohol was coated by spin coating, followed by drying to obtain an organic thin film recording layer of 800 Å thick.

An optical recording medium thus prepared was mounted on a turn table. Rotating the turn table to 1,800 rpm with a motor and using a semiconductor laser that gives oscillation wavelength of 830 nm, information was written in the recording layer from the substrate side under spot size of 1.5 μm in diameter, recording power of 6 mW and recording frequency of 3 MHz, and reproduced under a read-out power of 0.8 mW. The resulting reproduction wave form was spectrally analyzed (scanning filter, band width: 30 KHz) to measure C/N ratio.

Next, on the same recording medium, measured under the above measurement conditions was C/N ratio after reading was repeated $10^5$ times on the recorded area.

Further measured were transmission (830 nm measurement) and C/N ratio after a recording medium of the same type prepared under the above conditions was left to stand for 2,000 hours under the conditions of 60° C. and 90 % RH to carry out an environmental storage stability test. Results obtained are shown in Table 1.

TABLE 1

| | Initial stage | | After reproduction repeated $10^5$ times C/N (dB) | Environmental storage stability; 60° C., 90% RH, after 2,000 hours | |
|---|---|---|---|---|---|
| | Transmission (%) | C/N (dB) | | Transmission (%) | C/N (dB) |
| Example 1 | 18.7 | 56 | 55 | 20.6 | 54 |

Examples 2 to 9

Recording mediums were prepared in the same manner as in Example 1 except that the compound of azulenium salt No. (1) used in Example 1 was replaced with compounds Nos. (2), (4), (8), (12), (16), (21), (26) and (28) each, thus preparing optical recording mediums of Examples 2 to 9, respectively.

Measurement was made on the above optical recording mediums of Examples 2 to 9 in the same manner as in Example 1. Results obtained are shown in Table 2.

Comparative Examples 1 to 3

Recording mediums were prepared in the same manner as in Example 1 but using the following symmetrical azulenium salts Nos. (31), (32) and (33) as comparative compounds of the above unsymmetrical azulenium salts, thus preparing optical recording mediums of comparative Examples 1 to 3, respectively.

Measurement was made on the above optical recording mediums of Comparative Examples 1 to 3 in the same manner as in Example 1. Results obtained are shown in Table 2.

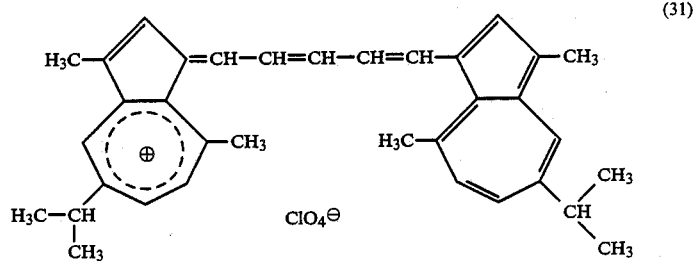

(31)

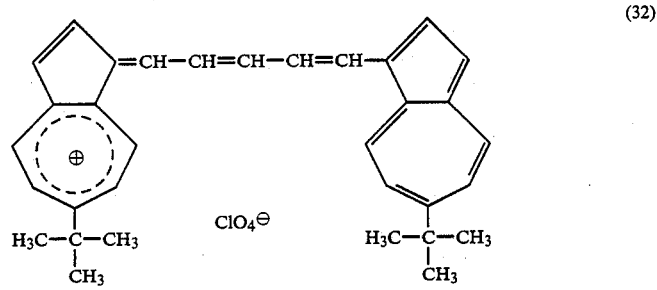

(32)

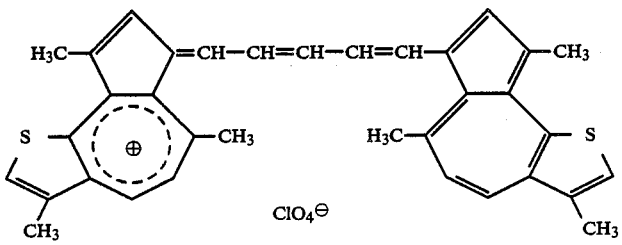
(33)

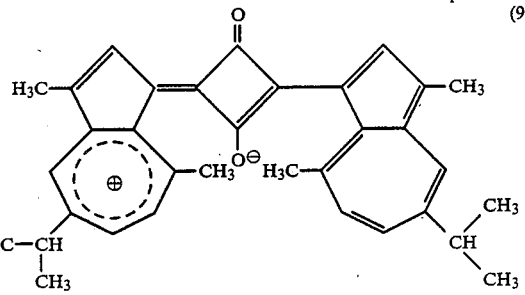
Compound No.: (93)

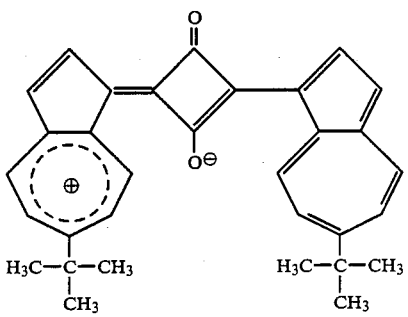
(94)

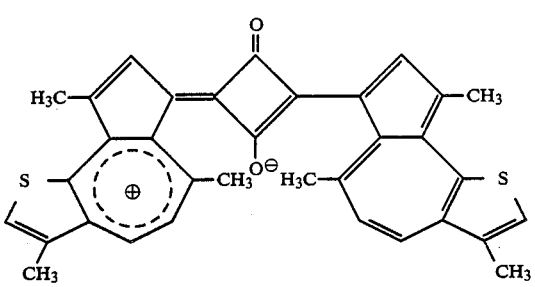
(95)

TABLE 2

| Compound No. | Initial stage Transmission (%) | C/N (dB) | After reproduction repeated 10⁵ times C/N (dB) | Environmental storage stability; 60° C., 90% RH, after 2,000 hours Transmission (%) | C/N (dB) |
|---|---|---|---|---|---|
| Example: | | | | | |
| 2 | (2) | 17.8 | 55 | 54 | 19.3 | 54 |
| 3 | (4) | 19.3 | 56 | 54 | 20.5 | 55 |
| 4 | (8) | 18.2 | 54 | 53 | 19.7 | 53 |
| 5 | (12) | 20.5 | 54 | 53 | 22.0 | 53 |
| 6 | (16) | 19.4 | 56 | 55 | 21.2 | 55 |
| 7 | (21) | 22.3 | 53 | 51 | 23.5 | 52 |
| 8 | (26) | 19.0 | 55 | 54 | 20.3 | 54 |
| 9 | (28) | 18.7 | 55 | 54 | 19.6 | 54 |
| Comparative Example: | | | | | |
| 1 | (31) | 19.0 | 56 | 54 | 22.3 | 52 |
| 2 | (32) | 19.5 | 55 | 53 | 23.0 | 51 |
| 3 | (33) | 20.3 | 55 | 54 | 22.1 | 52 |

Examples 10 to 18

Recording mediums were prepared in the same manner as in Example 1 except that the compound of azulenium salt No.(1) used in Example 1 was replaced with compounds Nos.(31), (32), (34), (38), (42), (46), (51), (56) and (58) each, thus preparing optical recording mediums of Examples 2 to 9, respectively. Measurement was made on these in the same manner as in Example 1. Results obtained are shown in Table 3.

Comparative Examples 4 to 6

Recording mediums were prepared in the same manner as in Example 1 but using the following symmetrical azulenium salts Nos.(93), (94) and (95) as comparative compounds of the above unsymmetrical azulenium salts, thus preparing optical recording mediums of Comparative Examples 4 to 6, respectively.

Measurement was made on the above optical recording mediums of Comparative Examples 4 to 6 in the same manner as in Example 1. Results obtained are shown in Table 3.

TABLE 3

| Compound No. | Initial stage Transmission (%) | C/N (dB) | After reproduction repeated 10⁵ times C/N (dB) | Environmental storage stability; 60° C., 90% RH, after 2,000 hours Transmission (%) | C/N (dB) |
|---|---|---|---|---|---|
| Example: | | | | | |
| 10 | (31) | 16.9 | 56 | 55 | 18.3 | 55 |
| 11 | (32) | 17.3 | 56 | 55 | 18.7 | 55 |
| 12 | (34) | 18.9 | 54 | 53 | 20.5 | 53 |
| 13 | (38) | 19.0 | 54 | 53 | 20.0 | 54 |
| 14 | (42) | 21.2 | 55 | 54 | 22.3 | 54 |
| 15 | (46) | 20.2 | 55 | 53 | 21.5 | 53 |
| 16 | (51) | 20.7 | 54 | 53 | 21.9 | 53 |
| 17 | (56) | 18.3 | 56 | 55 | 19.7 | 55 |
| 18 | (58) | 19.4 | 55 | 54 | 20.6 | 54 |

TABLE 3-continued

| | | Initial stage | | After reproduction repeated $10^5$ times | Environmental storage stability; 60° C., 90% RH, after 2,000 hours | |
|---|---|---|---|---|---|---|
| | Compound No. | Transmission (%) | C/N (dB) | C/N (dB) | Transmission (%) | C/N (dB) |
| Comparative Example: | | | | | | |
| 4 | (93) | 19.7 | 55 | 53 | 22.5 | 52 |
| 5 | (94) | 20.3 | 55 | 53 | 23.2 | 51 |
| 6 | (95) | 21.4 | 54 | 52 | 23.8 | 51 |

Examples 19 to 27

Example 1 was repeated except that the compound of azulenium salt No (1) used in Example 1 was replaced with compounds Nos. (61), (62), (64), (68), (72), (76), (81), (86) and (88) each, to prepare optical recording mediums of Examples 19 to 27, respectively. Measurement was made on these in the same manner as in Example 1. Results obtained are shown in Table 4.

Comparative Examples 7 to 9

Example 1 repeated but using the following symmetrical azulenium salts Nos.(96), (97) and (98) as comparative compounds of the above unsymmetrical azulenium salts, to prepare optical recording mediums of Comparative Examples 7 to 9, respectively. Measurement was made on these in the same manner as in Example 1. Results obtained are shown in Table 4.

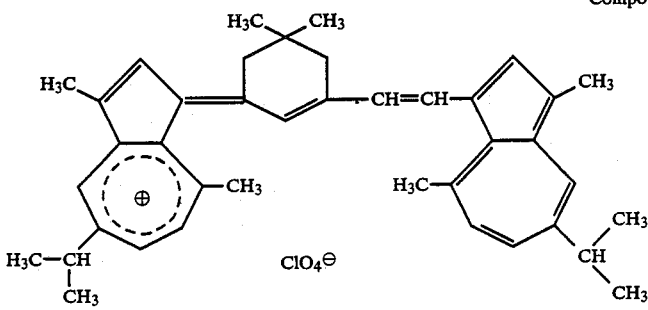

Compound No. (96)

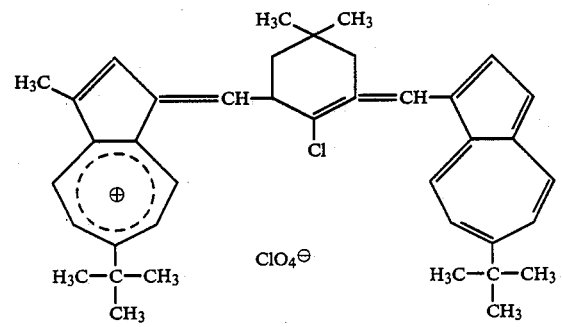

(97)

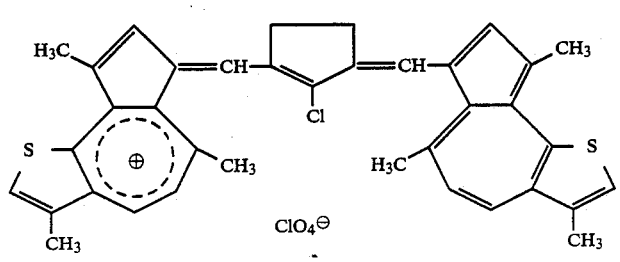

(98)

TABLE 4

| | | Initial stage | | After reproduction repeated $10^5$ times | Environmental storage stability; 60° C., 90% RH, after 2,000 hours | |
|---|---|---|---|---|---|---|
| | Compound No. | Transmission (%) | C/N (dB) | C/N (dB) | Transmission (%) | C/N (dB) |
| Example: | | | | | | |
| 19 | (61) | 18.9 | 56 | 55 | 20.3 | 54 |
| 20 | (62) | 18.4 | 56 | 55 | 19.6 | 55 |
| 21 | (64) | 18.9 | 55 | 54 | 20.2 | 54 |
| 22 | (68) | 17.8 | 54 | 53 | 19.3 | 53 |
| 23 | (72) | 21.0 | 55 | 54 | 22.3 | 54 |
| 24 | (76) | 19.2 | 55 | 54 | 20.5 | 54 |
| 25 | (81) | 21.7 | 54 | 52 | 23.2 | 53 |
| 26 | (86) | 19.5 | 55 | 54 | 20.8 | 54 |
| 27 | (88) | 18.6 | 56 | 54 | 19.7 | 55 |
| Comparative Example: | | | | | | |
| 7 | (96) | 19.3 | 56 | 54 | 22.5 | 52 |
| 8 | (97) | 20.0 | 55 | 53 | 23.6 | 51 |
| 9 | (98) | 20.5 | 55 | 53 | 22.2 | 52 |

Examples 28 & 29

The following compounds Nos. (91) and (92) each and the above azulenium salt compound No. (15) were mixed in diacetone alcohol in weight ratio of 1 : 2, respectively, and coating was performed in the same manner as in Example 1 to provide organic thin film recording layers each having a dried film thickness of 850 Å, thus preparing optical recording mediums of Examples 28 and 29. Measurement was made on these in the same manner as in Example 1. Results obtained are shown in Table 5.

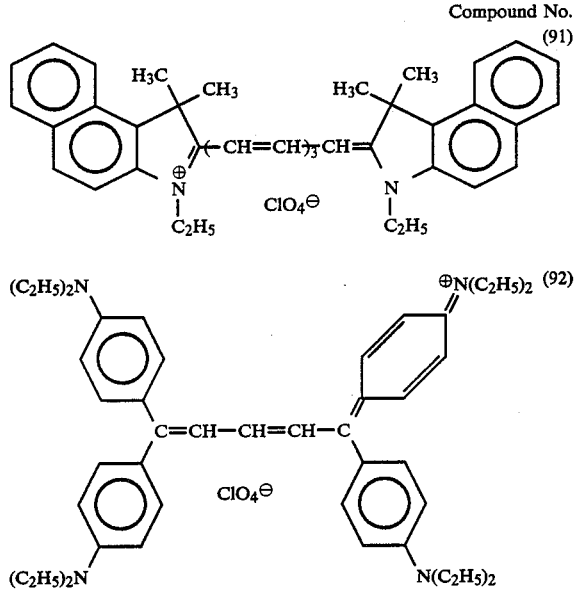

Compound No. (91)

Compound No. (92)

Examples 30 & 31

The above compounds Nos. (91) and (92) each and the above azulenium salt compound No.(45) were mixed in diacetone alcohol in weight ratio of 1 : 2, respectively, and coating was performed in the same manner as in Example 1 to provide organic thin film recording layers each having a dried film thickness of 850 Å, thus preparing optical recording mediums of Examples 30 and 31. Measurement was made on these In the same manner as in Example 1. Results obtained are shown in Table 5.

Examples 32 & 33

The above compounds Nos.(91) and (92) each and the above azulenium salt compound No.(75) were mixed in diacetone alcohol in weight ratio of 1 : 2, respectively, and coating was performed in the same manner as in Example 1 to provide organic thin film recording layers each having a dried film thickness of 850 Å, thus preparing optical recording mediums of Examples 32 and 33. Measurement was made on these in the same manner as in Example 1. Results obtained are shown in Table 5

Comparative Example 10

Example 28 was repeated but excluding the compound No:(15) used in Example 28, to prepare an optical recording medium, and measurement was made in the same manner. Results obtained are shown in Table 5.

TABLE 5

| Compound No. | Initial stage Transmission (%) | Initial stage C/N (dB) | After reproduction repeated $10^5$ times C/N (dB) | Environmental storage stability; 60° C., 90% RH, after 2,000 hours Transmission (%) | Environmental storage stability; 60° C., 90% RH, after 2,000 hours C/N (dB) |
|---|---|---|---|---|---|
| Example: | | | | | |
| 28 (15) (91) | 20.2 | 53 | 51 | 22.4 | 50 |
| 29 (15) (92) | 19.5 | 54 | 53 | 21.3 | 53 |
| 30 (45) (91) | 20.0 | 54 | 52 | 22.7 | 51 |
| 31 (45) (92) | 19.6 | 54 | 52 | 21.5 | 53 |
| 32 (75) (91) | 21.0 | 53 | 52 | 23.7 | 51 |
| 33 (75) (92) | 20.3 | 54 | 53 | 22.6 | 52 |
| Comparative Example: 4 (91) | 21.5 | 52 | 49 | 24.5 | 47 |

Example 34

On a PC substrate of 130 mm in diameter and 1.2 mm in thickness and provided with pregrooves by injection molding, a solution obtained by dissolving 2 parts by weight of the above exemplary compound No. (3) and 1 part by weight of nitrocellulose resin (OH-less Lacquer; available from Daicel Chemical Industries, Ltd.) in 97 parts by weight of diacetone alcohol was coated by spin coating to obtain an organic thin film recording layer of 1,000 Å in dried film thickness.

Measurement on the optical recording medium thus prepared was made in the same manner as in Example 1. Results obtained are shown in Table 6.

Examples 35 to 37

Example 34 was repeated but replacing the compound No.(3) used in Example 34 with the above compounds Nos.(10), (18) and (22) each, to prepare optical recording mediums of Examples 35 to 37, respectively.

Measurement on the above optical recording mediums of Examples 35 to 37 was made in the same manner as in Example 1. Results obtained shown in Table 6.

Examples 38 to 45

Example 34 was repeated but replacing the compound No.(3) used in Example 34 with the above compounds Nos.(33), (40), (48), (52), (63), (70), (78) and (88) each, to prepare optical recording mediums of Examples 38 to 41, respectively. Measurement on these was made in the same manner as in Example 1. Results obtained are shown in Table 6.

TABLE 6

| Example: | Compound No | Initial stage Transmission (%) | Initial stage C/N (dB) | After reproduction repeated $10^5$ times C/N (dB) | Environmental storage stability; 60° C., 90% RH, after 2,000 hours Transmission (%) | Environmental storage stability; 60° C., 90% RH, after 2,000 hours C/N (dB) |
|---|---|---|---|---|---|---|
| 34 | (3) | 19.8 | 55 | 54 | 21.3 | 53 |
| 35 | (10) | 20.4 | 54 | 53 | 22.0 | 53 |
| 36 | (18) | 18.3 | 55 | 54 | 20.0 | 54 |
| 37 | (22) | 18.7 | 56 | 54 | 19.8 | 55 |
| 38 | (33) | 19.3 | 55 | 54 | 20.7 | 54 |
| 39 | (40) | 19.8 | 55 | 53 | 21.6 | 53 |
| 40 | (48) | 17.6 | 54 | 53 | 18.9 | 54 |
| 41 | (52) | 18.2 | 55 | 54 | 19.7 | 54 |
| 42 | (63) | 20.3 | 55 | 54 | 21.6 | 53 |
| 43 | (70) | 21.0 | 54 | 53 | 22.5 | 53 |

TABLE 6-continued

| Example: | Compound No | Initial stage Transmission (%) | C/N (dB) | After reproduction repeated 10⁵ times C/N (dB) | Environmental storage stability; 60° C., 90% RH, after 2,000 hours Transmission (%) | C/N (dB) |
|---|---|---|---|---|---|---|
| 44 | (78) | 18.6 | 56 | 54 | 21.2 | 54 |
| 45 | (88) | 19.5 | 55 | 54 | 20.3 | 55 |

Example 46

On a PC substrate of 0.4 mm thick and having the size of a wallet, pregrooves were provided by hot pressing, and coated thereon by bar coating was a solution obtained by mixing 3 parts by weight of the compound of the above azulenium salt compound No.(1) into 97 parts by weight of diacetone alcohol, followed by drying to obtain an organic thin film recording layer of 1,000 Å thick. Further thereon a PC substrate of 0.3 mm thick and having the size of a wallet was closely adhered interposing an ethylene/vinyl acetate dry film, thus preparing an optical recording medium of closed structure.

The optical recording medium thus prepared was mounted on a stage driving in the direction of X-Y. Using a semiconductor laser that gives oscillation wavelength of 830 nm, information was written from the 0.4 mm thick PC substrate side in the direction of Y under spot size of 3.0 μm in diameter, recording power of 4.0 mW and recording pulse of 80 μsec, and reproduced under a read-out power of 0.4 mW. The resulting contrast ratio (A-B/A; A=signal strength at an unrecorded area, B=signal strength at a recorded area) was measured.

A recording medium of the same type prepared under the above conditions was further subjected to the environmental storage stability test under the same conditions as in Example 1 to measure the transmission and contrast ratio observed after the test. Results obtained are shown in Table 7.

Examples 47 & 48

Example 46 was repeated but replacing the compound No. (1) used in Example 46 with the above compound Nos. (31) and (61) each, to prepare optical recording mediums of Examples 47 and 48. Measurement on these was made in the same manner as in Example 46. Results obtained are shown in Table 7.

TABLE 7

| Example: | Compound No. | Initial stage Transmission (%) | Contrast ratio | Environmental storage stability; 60° C., 90% RH, after 2,000 hours Transmission (%) | Contrast ratio |
|---|---|---|---|---|---|
| 46 | (1) | 19.0 | 0.55 | 20.2 | 0.53 |
| 47 | (31) | 15.9 | 0.54 | 16.8 | 0.53 |
| 48 | (61) | 19.5 | 0.52 | 20.6 | 0.50 |

Example 49

Figure 5:
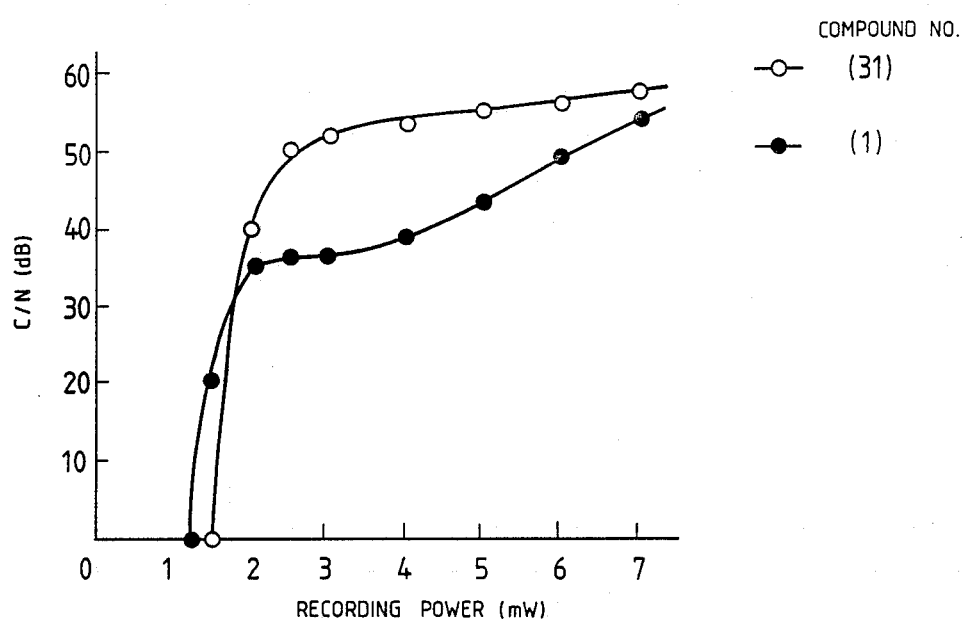
FIG. 5 is a graph showing carrier-to-noise (C/N) ratio versus the recording laser power of Compounds (1) and (31).

Measurement of changes in carrier to noise (C/N) ratio with respect to the strength of recording laser power was made on the optical recording mediums prepared in Example 1 and Comparative Example 1. Here, the C/N ratios were measured under band width of 30 KHz, carrier frequency of 3 MHz and recording speed of 11 m/sec. Results obtained are shown in FIG. 5.

What is claimed is:

1. An optical recording medium comprising a recording layer containing at least one compound selected from the group consisting of azulenium salt compounds represented respectively by Formulae, (II), (III) and (IV) shown below:

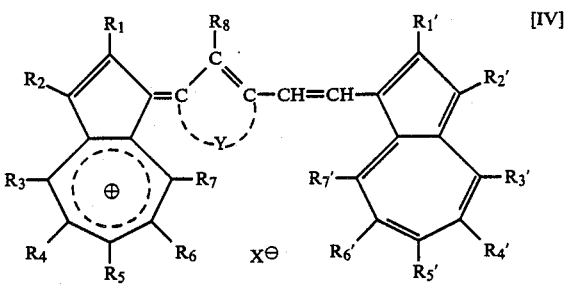

wherein $R_1$ to $R_{12}$ and $R'_1$ to $R'_7$ each represent a hydrogen atom, a halogen atom or a substituent that is a monovalent organic residual group: among combinations of $R_1$ with $R'_1$, $R_2$ with $R'_2$, $R_3$ with $R'_3$, $R_4$ with $R'_4$, $R_5$ with $R'_5$, $R_6$ with $R'_6$ and $R_7$ with $R'_7$, at least one combination comprises a combination of different substituents; $X^{\oplus}$ represents an anion residual group, and Y represents a divalent hydrocarbon group that forms a substituted or unsubstituted ring of 5 members, 6 members or 7 members: and any one combination among combinations of $R_1$ with $R_2$, $R_2$ with $R_3$, $R_3$ with $R_4$, $R_4$ with $R_5$, $R_5$ with $R_6$, $R_6$ with $R_7$, $R'_1$ with $R'_2$, $R'_2$ with $R'_3$, $R'_3$ with $R'_4$, $R'_4$ with $R'_5$, $R'_5$ with $R'_6$ and $R'_6$ with $R'_7$ may form a substituted or unsubstituted condensed ring.

2. The optical recording medium of claim 1, wherein among the combinations of $R_1$ with $R'_1$, $R_2$ with $R'_2$, $R_3$ with $R'_3$, $R_4$ with $R'_4$, $R_5$ with $R'_5$, $R_6$ with $R'_6$ and $R_7$ with $R'_7$ of the substituents for the azulenium salts represented respectively by the above Formulae (II), (III) and (IV), at least one combination comprises a combination of a hydrogen atom with an alkyl group or a hydrogen atom with an alkoxy group.

3. The optical recording medium of claim 1, wherein any of the substituents of $R_1$ to $R_7$ or $R'_1$ to $R'_7$ in at least one azulene ring form a heterocyclic ring in the form of $R_n-R_{n+1}$ or $R'_m-R'_{m+1}$ (n and m each is an integer of 1 to 6), and the substituent at the corresponding position in the other azulene ring is a hydrogen atom or an alkyl group.

4. The optical recording medium of claim 1, wherein at least one compound selected from the group consisting of the azulenium salt compound represented respectively by the above Formulae (II), (III) and (IV) is contained in the recording layer in an amount of from 40 to 100 % by weight.

5. The optical recording medium of claim 4, wherein at least one compound selected from the group consisting of the azulenium salts represented respectively by the above Formulae (II), (III) and (IV) is contained in the recording layer in an amount of from 50 to 100 % by weight 6. The optical recording medium of claim 1, wherein said recording layer has a film thickness of from 100 Å to 20 μm.

7. The optical recording medium of claim 6, wherein said recording layer has a film thickness of from 200 Å to 1 μm.

8. The optical recording medium of claim 1, which has a subbing layer between said recording layer and a substrate.

9. The optical recording medium of claim 8, herein said subbing layer has a film thickness of from 50 Å to 100 μm.

10. The optical recording medium of claim 9, wherein said subbing layer has a film thickness of from 200 Å to 30 μm.

11. The optical recording medium of claim 1, which has a protective layer on said recording layer.

12. The optical recording medium of claim 11, wherein said protective layer has a film thickness of 100 Å or more.

13. The optical recording medium of claim 12, wherein said protective layer has a film thickness of 1,000 Å or more.

14. The optical recording medium of claim 1, wherein a stabilizer is added in said recording layer.

15. The optical recording medium of claim 1, wherein said recording layer has absorption to the infrared region.

16. An optical recording method comprising forming pits and recording information by irradiation of a laser beam on an optical recording medium having a recording layer containing one or more of azulenium salt represented by Formulae (II), (III) or (IV) shown below:

wherein $R_1$ to $R_{12}$ and $R'_1$ to $R'_7$ each represent a hydrogen atom, a halogen atom or a substituent that is a monovalent organic residual group; among combinations of $R_1$ with $R'_1$, $R_2$ with $R'_2$, $R_3$ with $R'_3$, $R_4$ with $R'_4$, $R_5$ with $R'_5$, $R_6$ with $R'_6$ and $R_7$ with $R'_7$, at least one combination comprises a combination of different substituents; $X^\oplus$ represents an anion residual group, and Y represents a divalent hydrocarbon group that forms a substituted or unsubstituted ring of 5 members, 6 members or 7 members; and any one combination among combinations of $R_1$ with $R_2$, $R_2$ with $R_3$, $R_3$ with $R_4$, $R_4$ with $R_5$, $R_5$ with $R_6$, $R_6$ with $R_7$, with $R'_1$ with $R'_2$, $R'_2$ with $R'_3$, $R'_3$ with $R'_4$, $R'_4$ with $R'_5$, $R'_5$ with $R'_6$ and $R'_6$ with $R'_7$ may form a substituted or unsubstituted condensed ring.

17. The optical recording method of claim 16, wherein said laser beam has an oscillation wavelength in the near infrared region or infrared region.

* * * * *

UNITED STATES PATENT AND TRADEMARK OFFICE
CERTIFICATE OF CORRECTION

PATENT NO. : 4,965,178

DATED : October 23, 1990

INVENTOR(S) : TSUYOSHI SANTOH, ET AL.

It is certified that error appears in the above-identified patent and that said Letters Patent is hereby corrected as shown below:

COLUMN 3

Line 34, "$X^{\oplus}$" should read --$X^{\ominus}$--.

COLUMN 4

Line 43, "$X^{\oplus}$" should read --$X^{\ominus}$--.
Line 45, "or members;" should read -- or unsubstituted ring of 5 members, 6 members or 7 members;--.
Line 46, "$R'_2$," should read --$R_2$,-- and "$R'_3$," should read --$R_3$,--.
Line 47, "$R_6$ with $R_6$" should read --$R_6$, $R_6$ with--.

COLUMN 5

Line 16, "β-naphthyl" should read --α-naphthyl-- and "δ" should read --β--.
Line 38, "$R_2R_2$" should read --$R_2$, $R_2$--.

COLUMN 6

Line 1, "$X^{\oplus}$" should read --$X^{\ominus}$--.
Line 17, "$R'_1R_2$" should read --$R'_1$, $R_2$--.
Line 38, "R'phd 7" should read --$R'_7$--.
Line 39, "$R'_n - R'_{n-1}$" should read --$R'_n - R'_{n+1}$--.
Line 41, "$R'_n - R'n+1$" should read $R'_n - R'_{n+1}$--.
Line 49, "Formula" should read --Formula [1]--.

COLUMN 27

Comp. 55, "$\overset{|}{O}C_2H_5$" should read --$\overset{|}{C}H_3$--.

UNITED STATES PATENT AND TRADEMARK OFFICE
CERTIFICATE OF CORRECTION

PATENT NO. : 4,965,178
DATED : October 23, 1990
INVENTOR(S) : TSUYOSHI SANTOH, ET AL.

It is certified that error appears in the above-identified patent and that said Letters Patent is hereby corrected as shown below:

COLUMN 42

Line 54, "tiphenothiazine" should read --triphenothiazine--.

COLUMN 43

Line 15, "wages" should read --waxes--.

Line 65, "Al" should read --Al.--.

COLUMN 44

Line 5, "30" should read --30 µm.--

Line 38, "gallium aluminum" should read --gallium-aluminum--.

UNITED STATES PATENT AND TRADEMARK OFFICE
CERTIFICATE OF CORRECTION

PATENT NO. : 4,965,178           Page 3 of 5
DATED      : October 23, 1990
INVENTOR(S) : TSUYOSHI SANTOH, ET AL.

It is certified that error appears in the above-identified patent and that said Letters Patent is hereby corrected as shown below:

COLUMN 54

Line 10, "Formulae," should read --Formulae--.
Line 12, insert

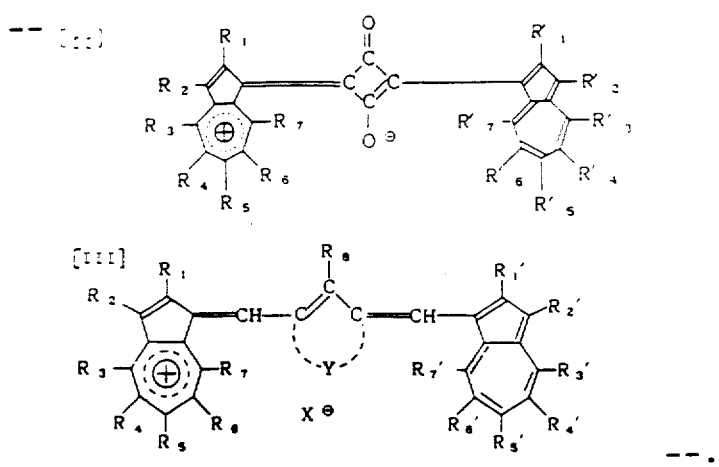

Line 32, "$X^{\oplus}$" should read --$X^{\ominus}$--.

Line 68, "weight" should read --weight.--.

COLUMN 55

Line 11, "herein" should read --wherein--.

UNITED STATES PATENT AND TRADEMARK OFFICE
CERTIFICATE OF CORRECTION

PATENT NO. : 4,965,178

DATED : October 23, 1990

INVENTOR(S) : TSUYOSHI SANTOH, ET AL.

It is certified that error appears in the above-identified patent and that said Letters Patent is hereby corrected as shown below:

COLUMN 56

Line 8, "below" should read
--below:

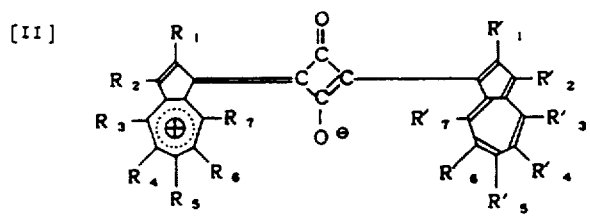

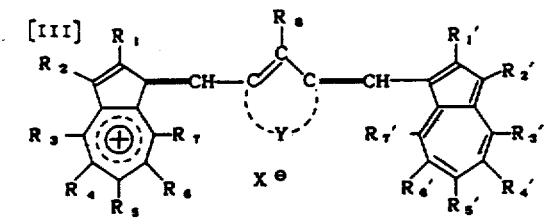

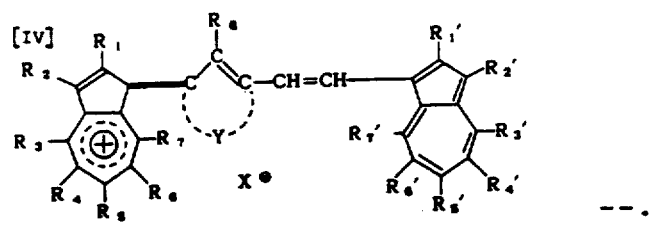

--.

UNITED STATES PATENT AND TRADEMARK OFFICE
CERTIFICATE OF CORRECTION

PATENT NO. : 4,965,178
DATED : October 23, 1990
INVENTOR(S) : TSUYOSHI SANTOH, ET AL.

It is certified that error appears in the above-identified patent and that said Letters Patent is hereby corrected as shown below:

COLUMN 56

Line 15, "$X^{\oplus}$" should read --$X^{\ominus}$--.

Signed and Sealed this

Twentieth Day of October, 1998

*Attest:*

BRUCE LEHMAN

*Attesting Officer* — *Commissioner of Patents and Trademarks*